(12) United States Patent
Hirzallah et al.

(10) Patent No.: US 12,507,275 B2
(45) Date of Patent: Dec. 23, 2025

(54) TECHNIQUES FOR TRANSMITTING DISCOVERY BURSTS USING FULL DUPLEX OPERATIONS

(71) Applicant: QUALCOMM Incorporated, San Diego, CA (US)

(72) Inventors: Mohammed Ali Mohammed Hirzallah, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 18/049,877

(22) Filed: Oct. 26, 2022

(65) Prior Publication Data

US 2024/0147521 A1 May 2, 2024

(51) Int. Cl.
*H04W 74/00* (2009.01)
*H04W 74/0833* (2024.01)

(52) U.S. Cl.
CPC ...... *H04W 74/002* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 10,637,619 | B2* | 4/2020 | Ng | H04L 5/0048 |
| 11,375,527 | B1* | 6/2022 | Eyuboglu | H04B 7/15528 |
| 11,838,151 | B1* | 12/2023 | Jones | H04L 25/0224 |
| 11,979,350 | B1* | 5/2024 | Eyuboglu | H04B 7/0874 |
| 2016/0073366 | A1* | 3/2016 | Ng | H04W 24/10 370/329 |
| 2016/0127098 | A1* | 5/2016 | Ng | H04L 5/001 370/329 |
| 2016/0345206 | A1* | 11/2016 | Yerramalli | H04W 74/006 |
| 2017/0195028 | A1* | 7/2017 | Shimezawa | H04B 7/0626 |
| 2017/0289818 | A1* | 10/2017 | Ng | H04L 5/0053 |
| 2017/0347270 | A1* | 11/2017 | Iouchi | H04L 5/0098 |
| 2019/0190668 | A1* | 6/2019 | Lei | H04W 74/085 |
| 2019/0207663 | A1* | 7/2019 | Shimezawa | H04B 17/309 |
| 2019/0238290 | A1* | 8/2019 | Liu | H04L 5/0048 |
| 2022/0191849 | A1* | 6/2022 | Yoon | H04W 72/044 |
| 2022/0217032 | A1* | 7/2022 | Ko | H04W 72/0446 |
| 2022/0272650 | A1* | 8/2022 | Ko | H04W 56/0045 |
| 2022/0338264 | A1* | 10/2022 | Ko | H04W 72/0446 |

(Continued)

*Primary Examiner* — Faiyazkhan Ghafoerkhan
(74) *Attorney, Agent, or Firm* — Dalei Dong; Holland & Hart LLP

(57) ABSTRACT

Methods, systems, and devices for wireless communications are described. A user equipment (UE) may receive a discovery burst from a network entity during the transmission duration. The received discovery burst may indicate a duplex operation mode used at the network entity for transmission of the discovery burst and a type of channel access procedure associated with a random access occasion included in the transmission duration. The UE may transmit a random access message to the network entity during the random access occasion based on a success of a channel access procedure. The channel access procedure may correspond to the indicated type of channel access procedure.

28 Claims, 18 Drawing Sheets

(56) References Cited

U.S. PATENT DOCUMENTS

| | | | |
|---|---|---|---|
| 2023/0126065 A1* | 4/2023 | Ko | H04W 76/20 370/329 |
| 2023/0126381 A1* | 4/2023 | Yoon | H04L 5/0092 |
| 2023/0164702 A1* | 5/2023 | Lee | H04W 52/32 455/522 |
| 2023/0199689 A1* | 6/2023 | Ko | H04L 5/001 370/350 |
| 2023/0284287 A1* | 9/2023 | Kung | H04L 5/0023 370/329 |
| 2024/0147521 A1* | 5/2024 | Hirzallah | H04W 74/002 |
| 2024/0195667 A1* | 6/2024 | Khan Beigi | H04W 48/16 |

* cited by examiner

TECHNIQUES FOR TRANSMITTING DISCOVERY BURSTS USING FULL DUPLEX OPERATIONS

FIELD OF DISCLOSURE

The present disclosure, for example, relates to wireless communication systems, more particularly to techniques for transmitting discovery bursts using full duplex operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE). Some communications systems may support wireless communication using a shared radio frequency spectrum band. In some cases, existing techniques to access resources of the shared radio frequency spectrum band may be deficient.

SUMMARY

The present disclosure relates to improved devices and apparatuses that support techniques for transmitting discovery bursts using full duplex operations. For example, some techniques described in the present disclosure provide a framework for extending a transmission duration used for transmitting discovery bursts to include random access occasions. In some examples, a user equipment (UE) may receive a discovery burst from a network entity during the transmission duration. In such examples, the received discovery burst may indicate a duplex operation mode used at the network entity for transmission of the discovery burst. Additionally, or alternatively, the received discovery burst may indicate a type of channel access procedure associated with a random access occasion included in the transmission duration. In some examples, the UE may transmit a random access message to the network entity during the random access occasion based on a success of a channel access procedure. The channel access procedure may correspond to the indicated type of channel access procedure.

A method for wireless communication at a user equipment (UE) is described. The method may include receiving a discovery burst from a network entity during a transmission duration, the received discovery burst indicating a duplex operation mode used for transmission of the discovery burst and a type of channel access procedure associated with a random access occasion included in the transmission duration and transmitting a random access message to the network entity during the random access occasion based on a success of a channel access procedure corresponding to the indicated type of channel access procedure.

An apparatus for wireless communication at a UE is described. The apparatus may include a processor, memory coupled with the processor, and instructions stored in the memory. The instructions may be executable by the processor to cause the apparatus to receive a discovery burst from a network entity during a transmission duration, the received discovery burst indicating a duplex operation mode used for transmission of the discovery burst and a type of channel access procedure associated with a random access occasion included in the transmission duration and transmit a random access message to the network entity during the random access occasion based on a success of a channel access procedure corresponding to the indicated type of channel access procedure.

Another apparatus for wireless communication at a UE is described. The apparatus may include means for receiving a discovery burst from a network entity during a transmission duration, the received discovery burst indicating a duplex operation mode used for transmission of the discovery burst and a type of channel access procedure associated with a random access occasion included in the transmission duration and means for transmitting a random access message to the network entity during the random access occasion based on a success of a channel access procedure corresponding to the indicated type of channel access procedure.

A non-transitory computer-readable medium storing code for wireless communication at a UE is described. The code may include instructions executable by a processor to receive a discovery burst from a network entity during a transmission duration, the received discovery burst indicating a duplex operation mode used for transmission of the discovery burst and a type of channel access procedure associated with a random access occasion included in the transmission duration and transmit a random access message to the network entity during the random access occasion based on a success of a channel access procedure corresponding to the indicated type of channel access procedure.

Some examples of the method, apparatuses, and non-transitory computer-readable medium described herein may further include operations, features, means, or instructions for monitoring for a status indicator corresponding to an availability of a communication channel based on the indicated type of channel access procedure corresponding to a type channel access procedure to be performed at the network entity.

Some examples of the method, apparatuses, and non-transitory computer-readable medium described herein may further include operations, features, means, or instructions for receiving the status indicator from the network entity based on the monitoring, where transmitting the random access message during the random access occasion may be based on the received status indicator indicating the availability of the communication channel during the random access occasion.

In some examples of the method, apparatuses, and non-transitory computer-readable medium described herein, receiving the discovery burst may include operations, features, means, or instructions for receiving, during a first portion of the transmission duration, an indication of the duplex operation mode used for transmission of the discovery burst and the type of channel access procedure associated with the random access occasion, the first portion of the transmission duration occurring prior to a second portion of the transmission duration that includes the random access occasion.

In some examples of the method, apparatuses, and non-transitory computer-readable medium described herein, transmitting the random access message may include operations, features, means, or instructions for transmitting the random access message to the network entity during the random access occasion based on a temporal gap between the first portion of the transmission duration and the second portion of the transmission duration satisfying a threshold.

Some examples of the method, apparatuses, and non-transitory computer-readable medium described herein may further include operations, features, means, or instructions for performing the channel access procedure during a temporal gap between the first portion of the transmission duration and the second portion of the transmission duration based on the indicated type of channel access procedure corresponding to a type of channel access procedure to be performed at the UE.

Some examples of the method, apparatuses, and non-transitory computer-readable medium described herein may further include operations, features, means, or instructions for receiving, from the network entity, an indication of a set of multiple resources preempted at the network entity, where the channel access procedure may be performed using the indicated set of multiple preempted resources.

Some examples of the method, apparatuses, and non-transitory computer-readable medium described herein may further include operations, features, means, or instructions for receiving signaling from the network entity and determining a sensing threshold associated with the channel access procedure based on a received power estimated at the UE using the received signaling, where the success of the channel access procedure may be based on the determined sensing threshold being satisfied.

In some examples of the method, apparatuses, and non-transitory computer-readable medium described herein, receiving the discovery burst may include operations, features, means, or instructions for receiving first signaling that indicates the duplex operation mode used for transmission of the discovery burst and receiving second signaling that indicates the type of channel access procedure associated with the random access occasion.

In some examples of the method, apparatuses, and non-transitory computer-readable medium described herein, the first signaling and the second signaling may be received at the UE using a broadcast channel, a control channel, or a shared data channel, or any combination thereof.

In some examples of the method, apparatuses, and non-transitory computer-readable medium described herein, a sensing duration associated with the channel access procedure may be based on the indicated type of channel access procedure.

In some examples of the method, apparatuses, and non-transitory computer-readable medium described herein, the discovery burst may be received from the network entity using a first set of time-frequency resources that may be non-overlapping, partially overlapping, or fully-overlapping in a frequency-domain with a second set of time-frequency resources used at the UE for transmitting the random access message.

A method for wireless communication at a network entity is described. The method may include performing a first channel access procedure to access a communication channel for outputting a discovery burst during a transmission duration, the first channel access procedure corresponding to a first type of channel access procedure that is based on a duplex operation mode used for outputting the discovery burst and outputting the discovery burst to a UE during the transmission duration based on a success of the first channel access procedure, the output discovery burst indicating the duplex operation mode and a second type of channel access procedure associated with a random access occasion included in the transmission duration.

An apparatus for wireless communication at a network entity is described. The apparatus may include a processor, memory coupled with the processor, and instructions stored in the memory. The instructions may be executable by the processor to cause the apparatus to perform a first channel access procedure to access a communication channel for outputting a discovery burst during a transmission duration, the first channel access procedure corresponding to a first type of channel access procedure that is based on a duplex operation mode used for outputting the discovery burst and output the discovery burst to a UE during the transmission duration based on a success of the first channel access procedure, the output discovery burst indicating the duplex operation mode and a second type of channel access procedure associated with a random access occasion included in the transmission duration.

Another apparatus for wireless communication at a network entity is described. The apparatus may include means for performing a first channel access procedure to access a communication channel for outputting a discovery burst during a transmission duration, the first channel access procedure corresponding to a first type of channel access procedure that is based on a duplex operation mode used for outputting the discovery burst and means for outputting the discovery burst to a UE during the transmission duration based on a success of the first channel access procedure, the output discovery burst indicating the duplex operation mode and a second type of channel access procedure associated with a random access occasion included in the transmission duration.

A non-transitory computer-readable medium storing code for wireless communication at a network entity is described. The code may include instructions executable by a processor to perform a first channel access procedure to access a communication channel for outputting a discovery burst during a transmission duration, the first channel access procedure corresponding to a first type of channel access procedure that is based on a duplex operation mode used for outputting the discovery burst and output the discovery burst to a UE during the transmission duration based on a success of the first channel access procedure, the output discovery burst indicating the duplex operation mode and a second type of channel access procedure associated with a random access occasion included in the transmission duration.

Some examples of the method, apparatuses, and non-transitory computer-readable medium described herein may further include operations, features, means, or instructions for performing a second channel access procedure during the transmission duration based on the indicated second type of channel access procedure corresponding to a type of channel access procedure to be performed at the network entity and outputting a status indicator corresponding to an availability of the communication channel to the UE based on the second channel access procedure.

Some examples of the method, apparatuses, and non-transitory computer-readable medium described herein may further include operations, features, means, or instructions for obtaining a random access message from the UE during the random access occasion based on the output status indicator indicating the availability of the communication channel during the random access occasion.

In some examples of the method, apparatuses, and non-transitory computer-readable medium described herein, outputting the discovery burst may include operations, features, means, or instructions for outputting, during a first portion of the transmission duration, an indication of the duplex operation mode used for outputting the discovery burst and the second type of channel access procedure associated with the random access occasion, the first portion of the transmission duration occurring prior to a second portion of the transmission duration that includes the random access occasion.

Some examples of the method, apparatuses, and non-transitory computer-readable medium described herein may further include operations, features, means, or instructions for obtaining a random access message from the UE during the random access occasion based on the indicated second type of channel access procedure corresponding to a type of channel access procedure to be performed at the UE and a temporal gap between the first portion of the transmission duration and the second portion of the transmission duration satisfying a threshold.

Some examples of the method, apparatuses, and non-transitory computer-readable medium described herein may further include operations, features, means, or instructions for obtaining a random access message from the UE during the random access occasion based on a success of a second channel access procedure corresponding to the indicated second type of channel access procedure.

In some examples of the method, apparatuses, and non-transitory computer-readable medium described herein, outputting, to the UE, an indication of a set of multiple resources preempted at the network entity based on the indicated second type of channel access procedure corresponding to a type of channel access procedure to be performed at the UE, where the second channel access procedure may be performed at the UE using the indicated set of multiple preempted resources.

Some examples of the method, apparatuses, and non-transitory computer-readable medium described herein may further include operations, features, means, or instructions for outputting signaling to the UE based on the indicated second type of channel access procedure corresponding to a type of channel access procedure to be performed at the UE, the output signaling to be used at the UE for determination of a sensing threshold associated with the second channel access procedure.

In some examples of the method, apparatuses, and non-transitory computer-readable medium described herein, a sensing duration associated with the second channel access procedure may be based on the indicated second type of channel access procedure.

In some examples of the method, apparatuses, and non-transitory computer-readable medium described herein, the discovery burst may be output at the network entity using a first set of time-frequency resources that may be non-overlapping, partially overlapping, or fully-overlapping in a frequency-domain with a second set of time-frequency resources used for obtaining the random access message from the UE.

In some examples of the method, apparatuses, and non-transitory computer-readable medium described herein, outputting the discovery burst may include operations, features, means, or instructions for outputting first signaling that indicates the duplex operation mode used for outputting the discovery burst and outputting second signaling that indicates the second type of channel access procedure associated with the random access occasion.

In some examples of the method, apparatuses, and non-transitory computer-readable medium described herein, the first signaling and the second signaling may be output using a broadcast channel, a control channel, or a shared data channel, or any combination thereof.

In some examples of the method, apparatuses, and non-transitory computer-readable medium described herein, a sensing duration associated with the first channel access procedure may be based on the first type of channel access procedure.

DETAILED DESCRIPTION

Figure 1:
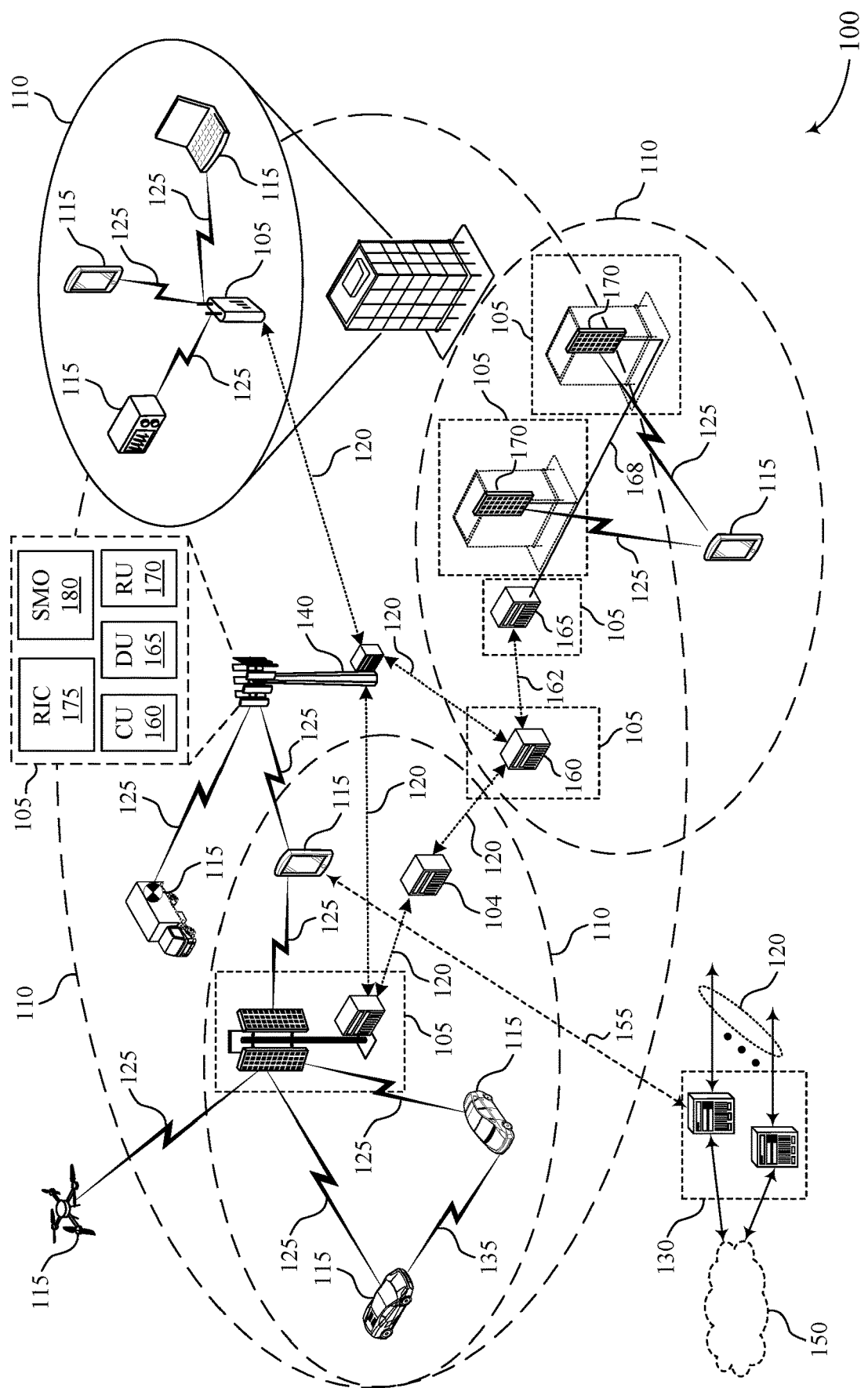
FIGS. 1 and 2 each illustrate an example of a wireless communications system that supports techniques for transmitting discovery bursts using full duplex operations in accordance with various aspects of the present disclosure.

A wireless communications system may be configured to support wireless communications using a shared radio frequency spectrum band that may be shared between multiple radio access technologies (RATs). For example, the shared radio frequency spectrum band may be shared between Wi-Fi, Bluetooth, and one or more cellular RATs, such as fourth generation (4G) systems (e.g., Long Term Evolution (LTE) systems), and fifth generation (5G) systems (e.g., New Radio (NR) systems), among other generations of cellular RATs, including subsequent generations of cellular RATs. In some examples, prior to using resources of the shared radio frequency spectrum band for a transmission, communication devices (e.g., a user equipment (UE), network entities) may perform a channel access procedure. For example, a network entity may perform a channel access procedure to determine whether one or more resources of the shared radio frequency spectrum band may be available (or unavailable) for a transmission.

In some examples, the network entity may transmit a set of signals, which may be referred to as a discovery burst, during a transmission duration to reduce a quantity of channel access procedures to be performed at the network entity. In such examples, the network entity may use one or more signals included in the discovery burst to indicate, to a UE, information associated with a random access procedure (e.g., random access information) to be performed at the UE. For example, the UE may perform the random access based on the indicated random access information to establish a connection with the network entity. Some frameworks for transmitting the discovery burst may assume half duplex operations (e.g., at the network entity and the UE). For example, in accordance with such frameworks, the UE may be configured to transmit a message as part of the random access procedure (e.g., a random access message) during a time duration subsequent to an end of the transmission duration irrespective of whether the UE receives the random access information prior to the end of the transmission duration. That is, the UE may be configured to refrain from transmitting the random access message during the transmission duration. In some examples, however, the UE may support full duplex operations in which the UE may transmit and receive communications simultaneously. In such examples, refraining from transmitting the random access message during the transmission duration may lead to unnecessary increases in latency.

Various aspects of the present disclosure relate to techniques for transmitting discovery bursts using full duplex operations and, more specifically, to a framework for extending a discovery burst transmission duration to include random access occasions. For example, the transmission duration may be extended to include random access occasions, such that the UE may transmit the random access message during the transmission duration. In some examples, the network entity may use one or more signals included in the discovery burst (e.g., that occur prior to one or more random access occasion) to indicate that the discovery burst is transmitted using full duplex operations. Additionally, or alternatively, the network entity may use the one or more signals (or one or more other signals) to indicate that the transmission duration includes random access occasions. In some examples, the network entity may use the one or more signals (or one or more other signals) included in the discovery burst to indicate a type of channel access procedure associated with the random access occasions. For example, the network entity may indicate a type of channel access procedure to be performed at the UE or the network entity, such that the UE may access a communication channel to transmit the random access message during one or more of the random access occasion.

In some examples, the indicated type of channel access procedure may correspond to a channel access procedure to be performed at the UE. For example, the indicated type of channel access procedure may correspond to a channel access procedure to be performed at the UE using resources preempted at the network entity. Additionally, or alternatively, the indicated type of channel access procedure may correspond to a channel access procedure to be performed at the UE using resource that may not be preempted by the network entity. In some other examples, the indicated type of channel access procedure may correspond to a channel access procedure performed at the network entity on behalf of the UE. In such examples, the network entity may indicate, to the UE, whether the UE may access the communication channel to transmit the random access message during a random access occasion. In some examples, extending the discovery burst transmission duration to include random access occasions may lead to increased resource utilization of the shared radio frequency spectrum band and increased random access efficiency, among other possible benefits.

Aspects of the disclosure are initially described in the context of wireless communications systems. Aspects of the disclosure are also described in the context of timing diagrams, full duplex operation schemes, and a process flow. Aspects of the disclosure are further illustrated by and described with reference to apparatus diagrams, system diagrams, and flowcharts that relate to techniques for transmitting discovery bursts using full duplex operations.

FIG. 1 illustrates an example of a wireless communications system 100 that supports techniques for transmitting discovery bursts using full duplex operations in accordance with various aspects of the present disclosure. The wireless communications system 100 may include one or more of the network entities 105, one or more of the UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links (e.g., a communication link 125, a radio frequency access link). For example, a network entity 105 may support a coverage area 110 (e.g., a geographic coverage area) over which the UEs 115 and the network entity 105 may establish one or more of the communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some examples of the UEs 115 are illustrated in FIG. 1. The UEs 115 described herein may be capable of supporting communications with various types of devices, such as other UEs (e.g., UEs 115) or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more of the network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) (e.g., a CU 160), a distributed unit (DU) (e.g., a DU 165), a radio unit (RU) (e.g., an RU 170), a RAN Intelligent Controller (RIC) (e.g., a RIC 175, a Near-Real Time RIC (Near-RT RIC), a Non-Real Time RIC (Non-RT RIC)), a Service Management and Orchestration (SMO) (e.g., a SMO 180) system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, radio frequency functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more of the DUs 165 or the RUs 170, and the one or more of the DUs 165 or the RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more of the DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., network entities 105) that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., IAB nodes 104) may be partially controlled by each other. One or more of the IAB nodes 104 may be referred to as a donor entity or an IAB donor. One or more of the DUs 165 or one or more of the RUs 170 may be partially controlled by one or more of the CUs 160 associated with a donor network entity (e.g., a network entity 105, a base station 140). The one or more donor network entities (e.g., network entities 105, IAB donors) may be in communication with one or more additional network entities (e.g., network entities 105, such as IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more of the IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for transmitting discovery bursts using full duplex operations as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs (e.g., UEs 115) that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more of the communication links 125 (e.g., an access link) using resources associated with one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of a radio frequency spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some examples of the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or a radio frequency spectrum band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple of the UEs 115 and UE-specific search space sets for sending control information to a UE 115.

In some examples, a network entity 105 (e.g., a base station 140, an RU 170) may be movable and therefore provide communication coverage for a moving coverage area (e.g., a coverage area 110). In some examples, different coverage areas (e.g., coverage areas 110 that may be different) associated with different technologies may overlap, but the different coverage areas (e.g., coverage areas 110 that may be different) may be supported by the same network entity (e.g., a network entity 105). In some other examples, the overlapping coverage areas (e.g., coverage areas 110 that may be overlapping) associated with different technologies may be supported by different network entities (e.g., network entities 105). The wireless communications system 100 may include, for example, a heterogeneous network in which different types of the network entities 105 provide coverage for various coverage areas (e.g., coverage areas 110) using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., UEs 115) via a device-to-device (D2D) communication link 135 (e.g., in accordance with a peer-to-peer (P2P), D2D, or sidelink protocol). In some examples, one or more of the UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more of the UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs (e.g., UEs 115) in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more radio frequency spectrum bands, which may be in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), unlicensed radio frequency spectrum band radio access technology, or NR technology using an unlicensed radio frequency spectrum band such as the 5 GHz industrial, scientific, and medical (ISM) band. While operating using unlicensed radio frequency spectrum bands, devices such as the network entities 105 and the UEs 115 may employ carrier sensing for collision detection and avoidance. In some examples, operations using unlicensed radio frequency spectrum bands may be based on a carrier aggregation configuration in conjunction with component carriers operating using a licensed radio frequency spectrum band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

In some examples, the wireless communications system 100 may support a framework for extending a discovery burst transmission duration to include random access occasions. For example, a UE 115 may receive a discovery burst from a network entity 105 during a transmission duration. In such examples, the received discovery burst may indicate a duplex operation mode used at the network entity 105 for transmission of the discovery burst. Additionally, or alternatively, the received discovery burst may indicate a type of channel access procedure associated with a random access occasion included in the transmission duration. In some examples, the UE 115 may transmit a random access message to the network entity 105 during the random access occasion based on a success of a channel access procedure corresponding to the indicated type of channel access procedure. The channel access procedure may be performed at the UE 115 or the network entity 105. In some examples, extending the discovery burst transmission duration to include the random access occasions may lead to improved random access efficiency within the wireless communications system 100, among other possible benefits.

Figure 2:
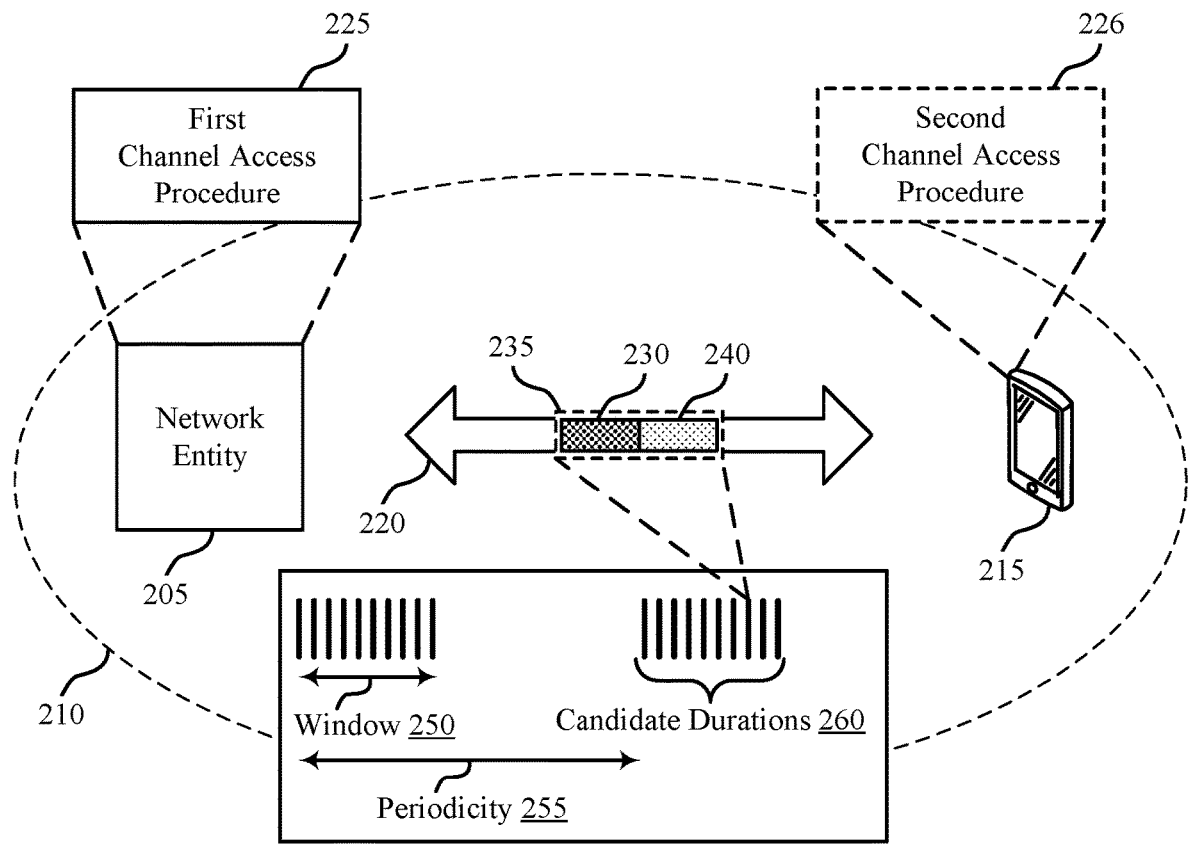

FIG. 2 illustrates an example of a wireless communications system 200 that supports techniques for transmitting discovery bursts using full duplex operations in accordance with various aspects of the present disclosure. The wireless communications system 200 may implement or be implemented at one or more aspects of the wireless communications system 100. For example, the wireless communications system 200 may include a network entity 205 and a UE 215, which may be examples of the corresponding devices as discussed with reference to FIG. 1. In the example of FIG. 2, the UE 215 and the network entity 205 may support wired or wireless communications within a coverage area 210, which may be an example of a coverage area 110 described with reference to FIG. 1. For example, the UE 215 and the network entity 205 may communicate using a communication link 220 (e.g., an uplink, a downlink), which may be an example of a communication link 125 as described with reference to FIG. 1.

In the example of FIG. 2, the UE 215 and the network entity 205 may communications using a shared radio frequency spectrum band. For example, the wireless communications system 200 may support one or more full duplex operation aspects, such as extending full duplex operations to the shared radio frequency spectrum band (e.g., an unlicensed radio frequency spectrum band, which may also be referred to as an unlicensed spectrum). That is, the UE 215 and the network entity 205 may support full duplex communications using the shared radio frequency spectrum band. In some examples, the network entity 205 and the UE 215 may not be guaranteed use of resources of the shared radio frequency spectrum for a transmission due to channel access constraints. That is, in some examples of the wireless communications system 200 (e.g., for NR-U), a time duration (e.g., a timing) of a transmission using one or more resources of the shared radio frequency spectrum band may not be guaranteed. For example, prior to a transmission using the shared radio frequency spectrum, the network entity 205 may perform a channel access procedure to determine whether one or more resources of the shared radio frequency spectrum band may be available (or unavailable) for the transmission.

The channel access procedure may, in some examples, include a listen-before-talk (LBT) procedure. For example, the wireless communications system 200 (e.g., an NR-U system) may support multiple (e.g., two) LBT channel access modes, such as a Type-1 channel access mode and a Type-2 channel access mode (e.g., for load balanced equipment). In some examples, a Type-1 channel access mode may be associated with an LBT procedure that includes a random idle channel waiting time and exponential backoff. Additionally, or alternatively, a Type-2 channel access mode may include one or more sub-types, such as Type-2A. In some examples, a Type-2A channel access mode may be associated with an LBT procedure that includes a fixed idle channel waiting time (e.g., at least 25 microseconds). A Type-2 channel access mode may include another sub-type, such as Type-2B. A Type-2B channel access mode may be associated with an LBT procedure with another fixed idle channel waiting time (e.g., at least 16 microseconds). Additionally, or alternatively, a Type-2 channel access mode may include yet another sub-type, such as Type-2C. In some examples, a Type-2C channel access mode may be associated with an LBT procedure without sensing, for example if an associated waiting time satisfies a threshold (e.g., is up to 16 microseconds). In some examples, an LBT procedure may be associated with a gap, such that a device (e.g., the UE 215, the network entity 205) performing the LBT procedure may be capable of switching between downlink communications and uplink communications. The gap may be based on the type of LBT procedure being performed.

In some examples, the network entity 205 may perform an LBT procedure prior to transmit signals to the UE 215. For example, the network entity 205 may transmit a synchronization signal block (SSB) to the UE 215. In some examples, an SSB (e.g., synchronization signal/physical broadcast channel (SS/PBCH) blocks) may be transmitted from the network entity 205 and used at the UE 215 during initial access (e.g., a cell search procedure or a cell selection procedure). For example, the SSB may be used at the UE 215 to obtain information, such as cell information or random access information, among other examples. That is, the UE 215 may use the SSB to obtain parameters for a random access procedure, which the UE 215 may perform to establish a connection with the network entity 205. In some examples, the SSB may include a primary synchronization signal (PSS), a secondary synchronization signal (SSS), and a PBCH (e.g., with one or multiple associated demodulation reference signals (DMRSs)). Additionally, or alternatively, the SSB may identify a CORESET for physical downlink control channel (PDCCH) scheduling of physical downlink shared channel (PDSCH) transmissions carrying a system information block (SIB). In some examples, the LBT procedure may be unsuccessful (e.g., may fail) and the network entity 205 may determine that the one or more resources are unavailable. In such an example, the network entity 205 may be unable to use the one or more resources and, as such, a timing of the SSB transmission may be delayed. That is, a timing of the SSB transmission may not be guaranteed.

In some examples, to reduce a quantity of LBT procedures performed at the network entity 205 (e.g., to transmit the SSB, the PDCCH, and the PDSCH carrying the SIB) the network entity 205 may be configured to support a window 250 (e.g., a time window, a discovery burst window) during which a discovery burst 230 of a combined SSB, PDCCH, and PDSCH with a SIB (e.g., SIB1), may be transmitted. For example, the window 250 may include a set of (N) candidate durations 260 (e.g., timings) that may be used for transmission of the discovery burst 230. In some examples, the candidate durations 260 may be preceded by an LBT procedure (e.g., a Type 2A LBT sensing procedure). For example, the network entity 205 may be configured with the window 250, which may include a set of the candidate durations 260 and be associated with a periodicity 255. In some examples, the network entity 205 may use a transmission duration 235 (e.g., included in a candidate duration of the candidate durations 260) to transmit the discovery burst 230, which may correspond to combined transmission of an SSB, a PDCCH, and a PDSCH with a SIB1 (e.g., PDSCH-SIB1), among other types of signals.

In some examples, the discovery burst 230 may be relatively short in duration. Additionally, or alternatively, the UE 215 may monitor for the discovery burst 230 (e.g., which may combine an SSB, a PDCCH, and a PDSCH-SIB1 in a contiguous transmission block) over the candidate durations 260 within the window 250 (e.g., a predefined window, a discovery burst window). In some examples, a quantity of candidate durations 260 included in the window 250 may depend on a subcarrier spacing (e.g., a value of N may be equal to about 10 or about 20, or some other suitable quantity, that may depend on a subcarrier spacing used at the network entity 205 or the UE 215). The window 250 may, in some examples, be about (e.g., up to about) 5 ms with a periodicity of about 20 ms.

In some examples, a discovery burst transmission format may assume (e.g., may be designed while assuming) half duplex operations. For example, the UE 215 may be configured to refrain from transmitting during a discovery burst transmission duration (e.g., the transmission duration 235). In some examples, one or more signals included in the discovery burst 230 (e.g., the SSB, the PDSCH-SIB1) may include information (e.g., random access information) associated with a random access procedure to be performed at the UE 215 to establish a connection with the network entity 205. In some examples, such a examples in which the discovery burst transmission format assumes half duplex operations, the UE 215 may be configured to transmit a message as part of the random access procedure (e.g., a random access message 240) some duration subsequent to the transmission duration 235. For example, the UE 215 may be configured to refrain from transmitting the random access message 240 during the transmission duration 235 irrespective of a time instance (e.g., during the transmission duration 235) during which the UE 215 receives the random access information. In some examples, however, the UE 215 may support full duplex operations in which the UE 215 may transmit and receive communications simultaneously. For example, the UE 215 and the network entity 205 may support inter-band full duplex (IBFD) in which uplink resources and downlink resources may overlap (e.g., fully overlap or partially overlap) in a time domain and a frequency domain. Additionally, or alternatively, the UE 215 and the network entity 205 may support sub-band full duplex (SBFD) in which uplink resources and downlink resources may overlap in time and be within a same radio frequency spectrum band. In some examples of SBFD, the uplink resources and downlink resources may be separated by a guard band. For example, full duplex communications may lead to one or more interference types, such as self-interference (e.g., at the full duplex-enabled device), inter-UE interference, inter-network entity interference, UE-to-adjacent cell interference, and adjacent cell-to-UE interference, among other possible examples. As such, to reduce interference between the uplink transmissions and the downlink transmissions, the uplink resources and the downlink resources may be separated by a guard band. In some examples, such as for full duplex-enabled devices, refraining from transmitting the random access message 240 during the transmission duration 235 may lead to unnecessary increases in latency.

In some examples, techniques for transmitting discovery bursts using full duplex operations, as described herein, may support updated LBT constraints and discovery burst channel occupancy time (COT) sharing conditions for employing full duplex for discovery burst transmissions. For example, such techniques may support LBT conditions such that the discovery burst may include (e.g., involve) random access occasions (e.g., within a same unlicensed channel). In some examples, techniques for transmitting a discovery burst using full duplex operations, as described herein, may support a framework for extending a discovery burst transmission duration (e.g., a transmission duration 235) to include random access occasions. In some examples, the framework for extending the discovery burst transmission duration to include random access occasions may support latency reduction for initial access and increased resource utilization (e.g., of a SBFD slot), among other possible benefits. Additionally, or alternatively, such techniques may be backwards compatible, such that half duplex random access occasions (e.g., and associated LBT constraints) may be used. For example, in accordance with such techniques, the network entity 205 may select (e.g., switch dynamically) between a half duplex mode and a full duplex mode.

In some examples, the discovery burst 230 (e.g., a discovery burst instance) may be transmitted (e.g., output) at the network entity 205 using either a full duplex mode or a half duplex mode. In some examples, in the full duplex mode, multiple random-access occasions may be integrated with the SSB, the PDCCH, and the PDSCH-SIB 1. That is, the transmission duration 235 of a full duplex-based (or half duplex-based) discovery burst may be extended (e.g., made longer) to fit multiple random access occasion durations. In such examples, the network entity 205 may indicate, to the UE 215, a duplex mode (e.g., the full duplex mode or the half duplex mode) used at the network entity 205 for transmission of the discovery burst 230. For example, the network entity 205 may perform a first channel access procedure 225 to access a communication channel for outputting the discovery burst 230 to the UE 215 during the transmission duration 235. The first channel access procedure 225 may correspond to a first type of channel access procedure that may be based on a duplex operation mode used at the network entity 205 for outputting the discovery burst 230.

In some examples, for a full duplex-enabled discovery burst instance, the network entity 205 may use one of multiple channel access procedures to initiate the discovery burst transmission. For example, the network entity 205 may use (e.g., may be configured to use or may select dynamically) a channel access procedure to gain access to resources of the shared radio frequency spectrum band for transmission of the discovery burst 230 using a full duplex operation mode. In some examples, the network entity 205 may use a same type of channel access procedure (e.g., a same LBT type) as may be used for half duplex operations. Additionally, or alternatively, the network entity 205 may use another LBT type with a relatively long sensing duration, such as a Type-2Ae LBT procedure. In some examples, a Type-2Ae LBT procedure may include a sensing duration that may be (e.g., at least) some quantity of microseconds larger than a sensing duration used for Type-2A LBT procedures. Additionally, or alternatively, the network entity 205 may use a Type-1 LBT procedure (e.g., may use carrier-sense multiple access with collision avoidance (CSMA/CA) with exponential backoff).

In some examples, the network entity 205 may output (e.g., transmit) the discovery burst 230 to the UE 215 during the transmission duration 235 based on a success of the first channel access procedure 225. In such examples, the discovery burst 230 may indicate the duplex operation mode used at the network entity 205 for transmission of the discovery burst 230. For example, the network entity 205 may indicate, to the UE 215, whether the discovery burst 230 (e.g., the discovery burst instance) may be transmitted in half duplex or full duplex using the discovery burst 230. That is, the network entity 205 may indicate, to the UE 215, a duplex operation mode used for transmission of the discovery burst 230. In some examples, the network entity 205 may use one or more bits included in the PBCH master information block (PBCH-MIB) to indicate the duplex operation mode. For example, the network entity may use a bit indication (e.g., an explicit bit indication) as part of the PBCH-MIB. Additionally, or alternatively, the indication of the duplex operation mode may be jointly encoded, for example with other information included in the MIB (e.g., using a physical resource block (PRB) grid offset or broadcast channel subcarrier spacing flag). In some examples, to indicate the duplex operation mode used for transmission of the discovery burst 230, the network entity 205 may use one or more bits included in a PDCCH scheduling message (e.g., a DCI format 1_0), such as a second message (e.g., Msg2 or MsgB) transmitted as part of the random access procedure (e.g., a random access response message). For example, the network entity 205 may use a bit indication (e.g., an explicit bit indication) as part of the PDCCH. Additionally, or alternatively, to indicate the duplex operation mode used for transmission of the discovery burst 230, the network entity 205 may use one or more bits included in the PDSCH-SIB1 (e.g., using reserved bit in the MAC sub-header or within the MAC payload). For example, the network entity 205 may use a bit indication (e.g., an explicit bit) indication as part of the PDSCH-SIB 1.

Additionally, or alternatively, the discovery burst 230 may indicate a second type of channel access procedure associated with a random access occasion included in the transmission duration 235. In some examples, for a full duplex-enabled (or half duplex-enabled) discovery burst instance, the discovery burst 230 may include an indication of the second type of channel access procedure (e.g., a second LBT type). In some examples, the network entity 205 may indicate the second type of channel access procedure using one or more bits included in the PBCH-MIB, the PDCCH, or the PDSCH-SIB1. For example, the network entity 205 may use a bit indication (e.g., (e.g., an explicit bit indication) as part of the PBCH-MIB, the PDCCH, or the PDSCH-SIB1. The second type of channel access procedure may correspond to a channel access procedure that the UE 215 may use prior to transmitting a random access message 240 (e.g., a random access preamble, which may also be referred to as a physical random access channel (PRACH)) using one or more of the random access occasions scheduled during the discovery burst 230. For example, the second type of channel access procedure may correspond to channel access procedure to be performed at the network entity 205 on behalf of the UE 215. That is, the network entity 205 may perform a channel access procedure such that the UE 215 my transmit the random access message 240 using one or more of the random access occasions scheduled during the discovery burst 230. In such examples, the network entity 205 may use the discovery burst 230 to indicate, to the UE 215, whether the channel access procedure was successful (e.g., whether the UE 215 may access the channel during the random access occasions to transmit the random access message 240). That is, the discovery burst 230 may include an indication of random access occasion availability. In some examples, in response to receiving the indication of random access occasion availability from the network entity 205, the UE 215 may transmit the random access message 240 to the network entity 205 during a random access occasion included in the transmission duration 235. That is, the UE 215 may transmit the random access message 240 based on a success of a channel access procedure performed at the network entity 205.

In some other examples, the second type of channel access procedure indicated using the discovery burst 230 may correspond to a type of channel access procedure to be performed at the UE (e.g., a second channel access procedure 226). For example, the UE 215 may perform the second channel access procedure 226 in response to receiving the indication of the second type of channel access procedure. Additionally, or alternatively, the UE 215 may transmit the random access message 240 (e.g., as part of the random access procedure) to the network entity 205 during the random access occasion included in the transmission duration 235. In some examples, using the random access occasion included in the transmission duration 235 to transmit the random access message 240 may lead to latency reduction for initial access within the wireless communications system 200, among other possible benefits.

FIGS. 3A, 3B, 3C, and 3D illustrate examples of timing diagrams 300 that support techniques for transmitting discovery bursts using full duplex operations in accordance with various aspects of the present disclosure. In some examples, the timing diagrams 300 (e.g., a timing diagram 300-a, a timing diagram 300-b, a timing diagram 300-c, and a timing diagram 300-d) may be implemented at one or more aspects of the wireless communications system 100 and the wireless communications system 200. For example, the timing diagrams 300 may be implemented at a UE, which may be an example of a UE as described with reference to FIGS. 1 and 2. The timing diagrams 300 may also be implemented at a network entity, which may be an example of one or more network entities (e.g., a CU, a DU, an RU, a base station, an IAB node, or one or more other network nodes) as described with reference to FIGS. 1 and 2. The timing diagrams 300 may support features for improved communications between the network entity and the UE, among other possible benefits.

In some examples, a transmission duration (e.g., a transmission duration 320-a, a transmission duration 320-b, a transmission duration 320-c, and a transmission duration 320-d), which may be used to transmit a discovery burst, may be extended to include random access occasions (ROs). For example, the transmission duration 320-a, the transmission duration 320-b, the transmission duration 320-c, and the transmission duration 320-d may be extended to include an RO 315-a, an RO 315-b, an RO 315-c, and an RO 315-d, respectively. Although illustrated in the examples of FIGS. 3A, 3B, 3C, and 3D as a single RO, it is to be understood that the ROs 315 may include one or multiple ROs. In some examples, the transmission durations 320 may be preceded by an LBT procedure, such that the network entity may use one or more resources of a shared radio frequency spectrum to transmit the discover burst during the transmission durations 320. For example, the transmission duration 320-a, the transmission duration 320-b, the transmission duration 320-c, and the transmission duration 320-d may be preceded by a first LBT 305-a, a first LBT 305-b, a first LBT 305-c, and a first LBT 305-d, respectively. The first LBTs 305 may be examples of a first LBT procedure as described with reference to FIG. 2. For example, the first LBTs 305 may correspond to a type of LBT procedure performed at the network entity. Additionally, or alternatively, the first LBTs 305 may include a Type-1 LBT procedure or a Type-2 LBT (e.g., a Type-2A, a Type-2Ae, a Type-2B) procedure. In some examples, prior to transmitting a message (e.g., a random access message) using the ROs 315 included in the transmission durations 320, the UE or the network entity may perform another LBT procedure (e.g., a second LBT procedure, such as a second LBT 306-a, a second LBT 306-b, or a second LBT 306-c).

For example, for a full duplex-enabled (or a half duplex-enabled) discovery burst, one or more modes may be used at the UE for UE channel access with (or without) an LBT procedure. For example, the UE may use one or more operation modes to access a communication channel for transmitting a random access preamble (e.g., a PRACH) using ROs scheduled during a discovery burst transmitted using full duplex operations. That is, the UE may use multiple operation modes to access a communication channel (e.g., use resources of the shared radio frequency spectrum) for transmission of the random access message during an RO scheduled during the discovery burst (e.g., and included in the transmission duration used for transmitting the discovery burst). In some examples, the UE may use a first mode (e.g., Mode-1) which may correspond to channel access with UE-based LBT procedures. Additionally, or alternatively, the UE may use a second mode (e.g., Mode-2), which may correspond to channel access with network entity-based LBT procedures.

Figure 3A:
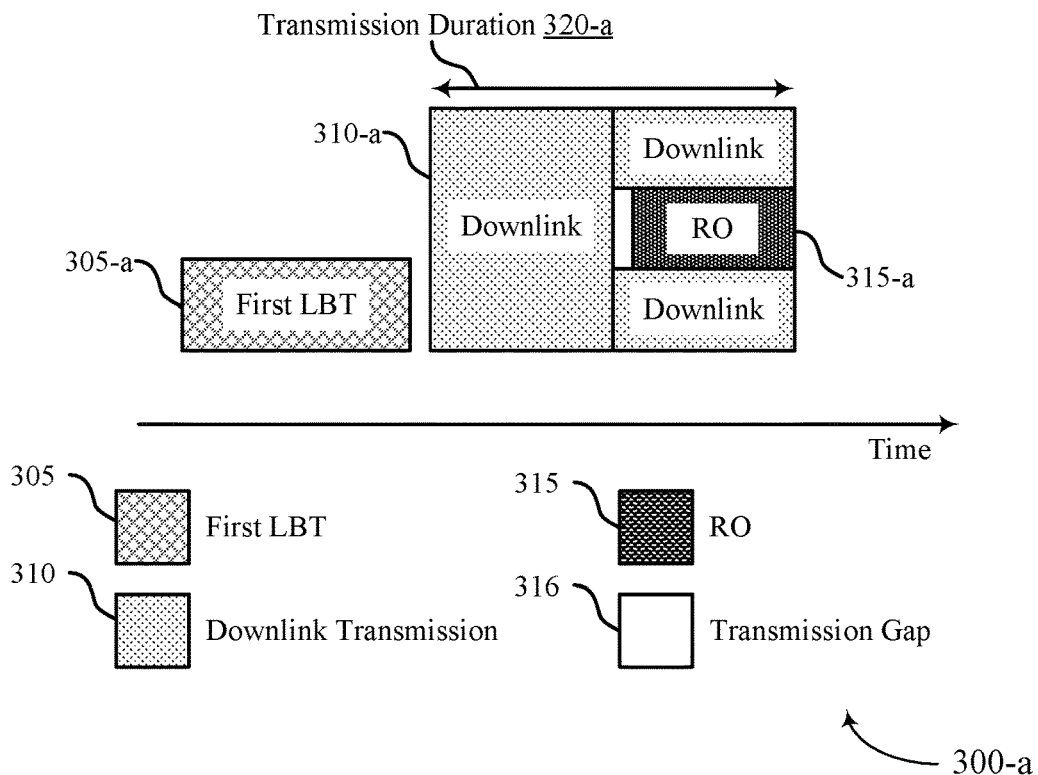
FIGS. 3A, 3B, 3C, and 3D illustrate examples of timing diagrams that support techniques for transmitting discovery bursts using full duplex operations in accordance with various aspects of the present disclosure.
Figure 3B:
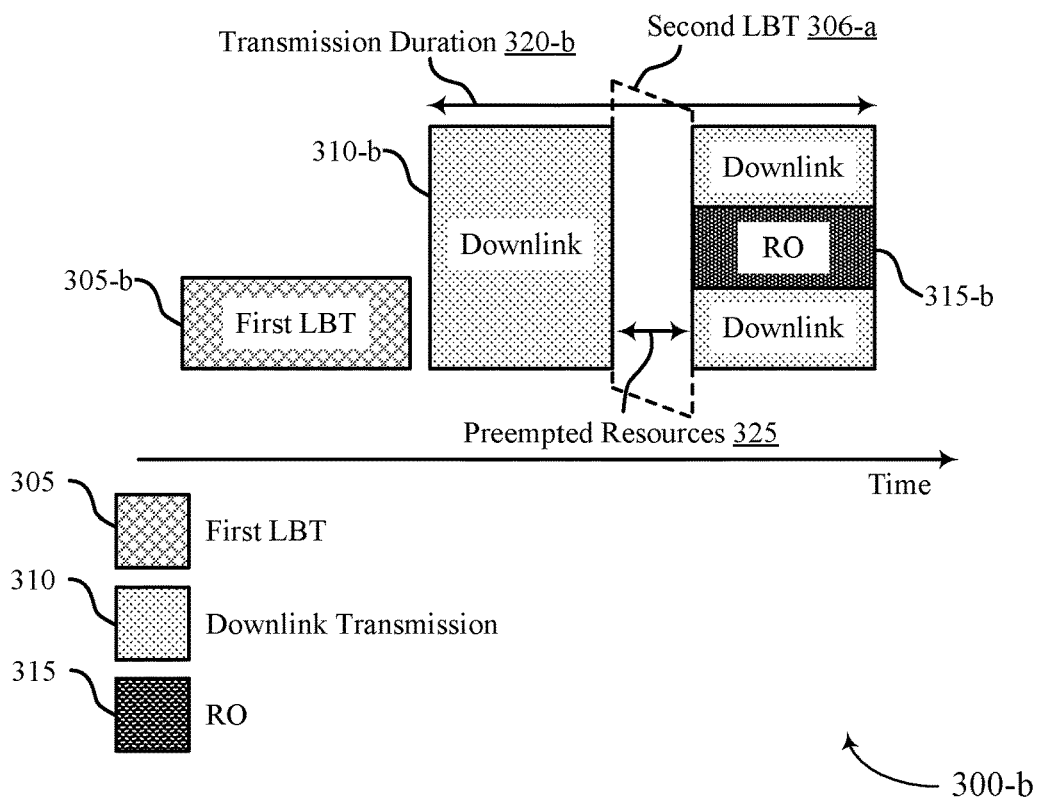
Figure 3C:
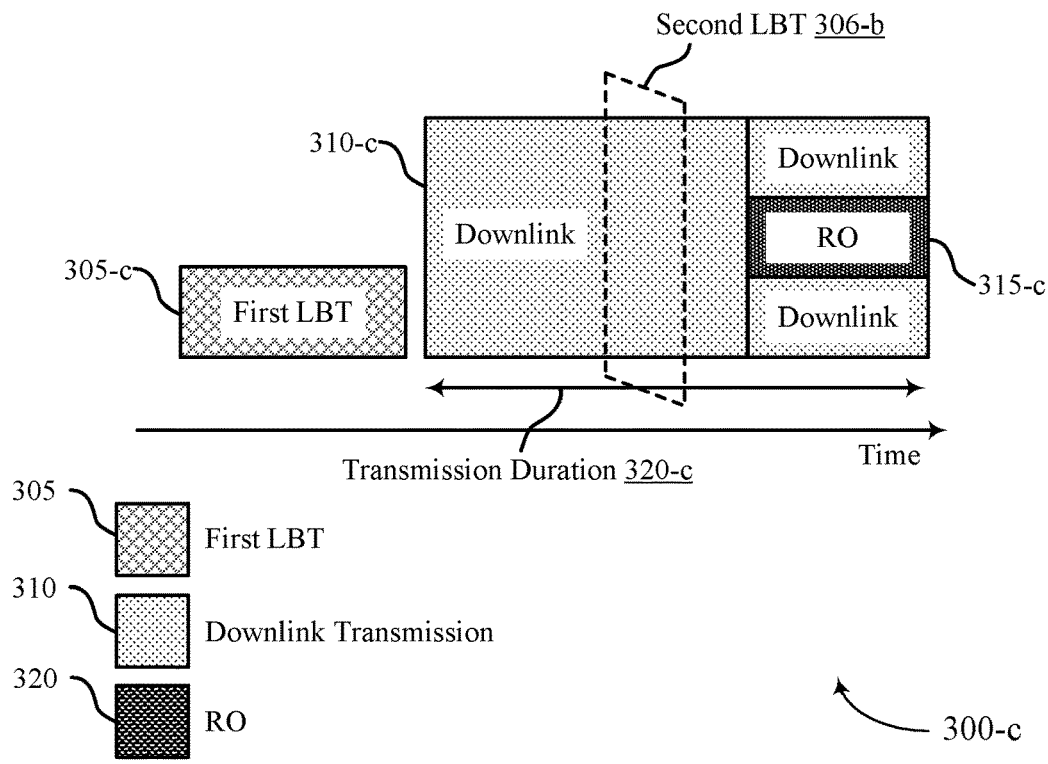

In some examples, Mode-1 may include a first sub-mode (e.g., Mode-1a), which may correspond to channel access with UE-based LBT procedures using downlink resource preemption. As illustrated in the example of FIG. 3B, the network entity may preempt downlink resources that precede an RO timing (e.g., precede ROs included in the transmission duration, such as the RO 315-b). In such an example, the preempted resources 325 may enable the UE to conduct the second LBT 306-a prior to an occurrence of the RO 315-b. Additionally, or alternatively, Mode-1 may include a second sub-mode (e.g., Mode-1b), which may correspond to channel access with UE-based LBT procedures without using downlink resource preemption. As illustrated in the example of FIG. 3C, the UE may conduct the second LBT 306-b prior to an occurrence of the RO 315-c while the network entity may be sending downlink transmission 310-c. In such an example, the UE may estimate a network entity received power and utilize the information (e.g., the estimated received power) to select a suitable clear channel assessment (CCA) or sensing threshold, which may be used at the UE for determining whether a communication channel may be available (or unavailable).

Figure 3D:
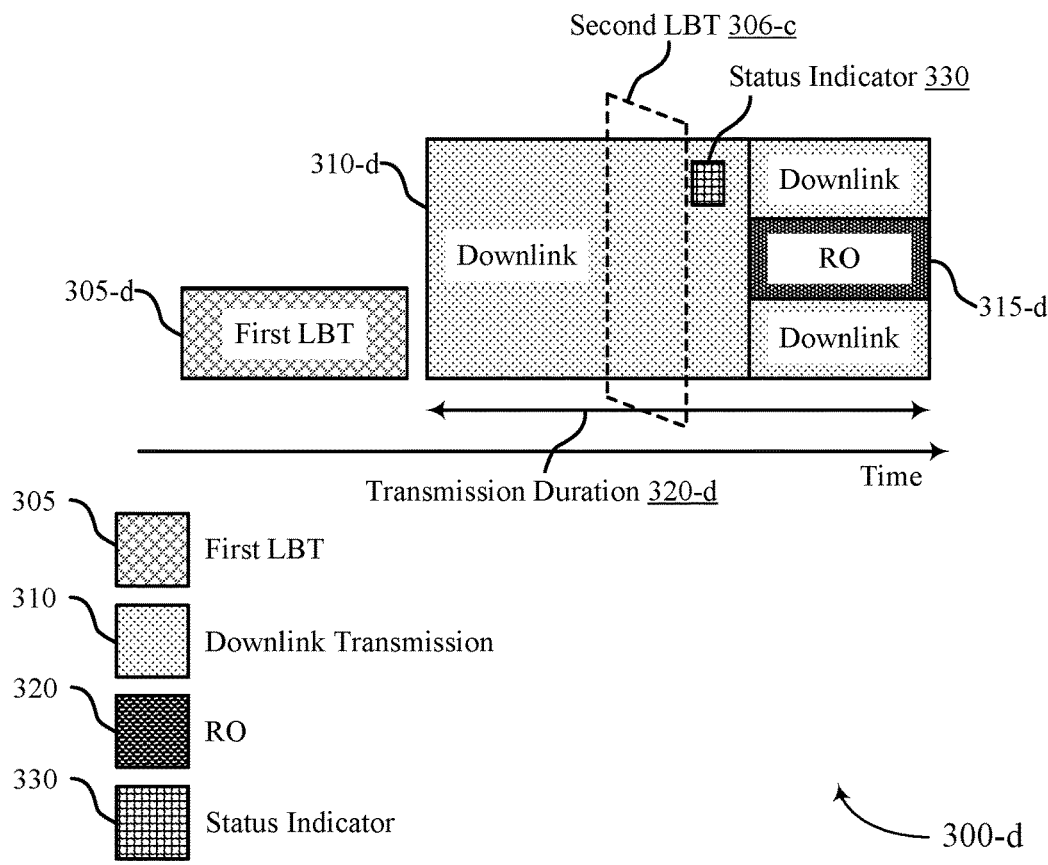

In some examples, Mode-2 (e.g., network-assisted LBT) may correspond to channel access in which the network entity conducts, simultaneously, downlink transmissions and the second LBT procedure on behalf of the UE prior to an occurrence of the RO. As illustrated in the example of FIG. 3D, the network entity may simultaneously conduct downlink transmission 310-d and a second LBT 306-c prior to an occurrence of the RO 315-d. In such an example, the network entity may signal, to the UE, to send the random access message (e.g., a PRACH) using the RO 315-*d*. For example, the network entity may signal (e.g., based on a success of the second LBT 305-*c*) for the UE to use the RO 315-*d* for transmission of the PRACH using broadcast bit information that may indicate whether the RO 315-*d* may be available (or unavailable).

In some examples, the UE may access the communication channel without performing the second LBT procedure prior to an occurrence of the ROs scheduled during the discovery burst. As illustrated in the examples of FIG. 3A, the UE may transmit the random access message to the network entity during the RO 315-*a* based on a transmission gap 316 (e.g., a temporal gap) between a first portion of the transmission duration 320 (e.g., a portion during which the downlink transmission 310-*a* may occur) and a second portion of the transmission duration (e.g., a portion during which the RO 315-*a* may occur) satisfying a threshold. That is, the UE may transmit the random access message during the RO 315-*a* based on the transmission gap 316 satisfying a threshold. In some examples, the threshold (e.g., about 16 microseconds) may be based on a capability of the UE to switch between uplink communication and downlink communication. For example, the threshold may be based on a processing duration used at the UE to switch between uplink communication and downlink communication. In such an example, the UE may transmit the random access message during the RO 315-*a* based on a capability of the UE to switch between uplink communication and downlink communication during the transmission gap 316.

Additionally, or alternatively, the UE may access the communication channel using the second LBTs 306 prior to an occurrence of ROs 315 scheduled during the discovery burst. For example, the UE may use a Type-2B LBT procedure, a Type-2A LBT procedure, or a Type-2Ae LBT procedure prior to the occurrence of the ROs schedule during the discovery burst to assess whether the communication channel may be available. In some examples, a Type-2Ae LBT procedure may include a longer sensing duration than a Type 2A LBT procedure.

In some examples, the UE may perform the second LBT procedure in accordance with Mode-1a. As illustrated in the example of FIG. 3B, the UE may perform the second LBT 306-*a* (e.g., a Type-2B LBT procedure, a Type-2A LBT procedure, or a Type-2Ae LBT procedure) using the preempted resources 325. For example, the UE may receive (e.g., using a downlink transmission 310-*b*) an indication of multiple resources preempted at the network entity (e.g., the preempted resources 325). In such an example, the UE may perform the second LBT 306-*a* using the preempted resources 325 based on the received indication. In some examples, the UE may transmit the random access message using the RO 315-*b* based on a success of the second LBT 306-*a*.

Additionally, or alternatively, the UE may perform the second LBT procedure in accordance with Mode-1b. As illustrated in the example of FIG. 3C, the UE may perform the second LBT 306-*b* (e.g., a Type-2B LBT procedure, a Type-2A LBT procedure, or a Type-2Ae LBT procedure) without using preempted resources. For example, the UE may perform the second LBT 306-*b* during the downlink transmission 310-*c*. In such an example, the UE may receive downlink signaling from the network entity and may use the received signaling to determine a sensing threshold. The sensing threshold may be associated with the second LBT 306-*b*. For example, the UE may determine the sensing threshold for the second LBT 306-*b* based on a received power estimated at the UE using the received signaling. In such an example, the UE may use the sensing threshold to determine whether the second LBT 306-*b* is successful (or unsuccessful). For example, the UE may determine that the second LBT 306-*b* is successful based on the sensing threshold being satisfied (e.g., by signaling transmitted by one or more other devices). In such an example, the UE may transmit the random access message using the RO 315-*c* based on the success of the second LBT 306-*b*.

In some examples, for a full duplex-enabled (or half duplex-enabled) discovery burst instance, the UE may use one or more LBT procedures in accordance with Mode-2. For example, the UE may use a network-assisted LBT procedure, which may enable the UE to send the random access message (e.g., the PRACH) using the ROs scheduled during the discovery burst. As illustrated in the example of FIG. 3D, the UE may use a second LBT 306-*c*, which may be performed at the network entity on behalf of the UE. In some examples, the network entity may perform downlink transmission 310-*d* and the second LBT 305-*c* simultaneously. For example, the network entity may conduct the second LBT 306-*c* prior to an occurrence of one or more ROs scheduled during the discovery burst (e.g., prior to the RO 315-*d*). In some examples, the second LBT 306-*c* may include a Type-2A LBT procedure or a Type-2Ae LBT procedure, which may include a longer sensing duration than a Type 2A LBT procedure. In such an example, based on a success of the second LBT 306-*c*, the network entity may announce, to the UE, an availability of the RO 315-*d*. For example, the UE may monitor for a status indicator 330, which may correspond to an availability of the communication channel. The UE may monitor for the status indicator based on receiving an indication of a second type of channel access procedure that corresponds to a type of channel access procedure to be performed at the network entity. In some examples, the UE may receive the status indicator 330 from the network entity (e.g., based on the monitoring) and may transmit the random access message during the RO 315-*d* based on the status indicator 330 indicating an availability of the communication channel during the RO 315-*d*. In some examples, using the status indicator 330 to indicate an availability of the communication channel may lead to latency reduction for initial access with the network entity, among other possible benefits.

Figure 4A:
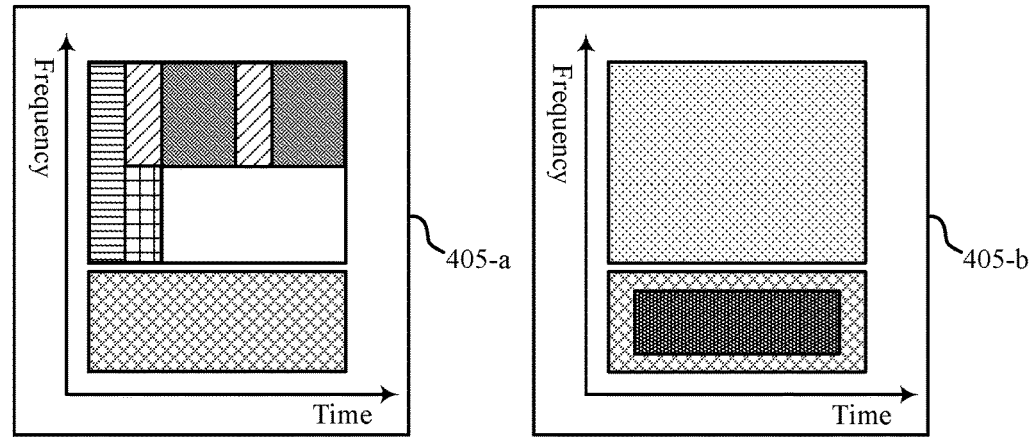
FIGS. 4A and 4B illustrate examples of full duplex operation schemes that support techniques for transmitting discovery bursts using full duplex operations in accordance with various aspects of the present disclosure.
Figure 4A:
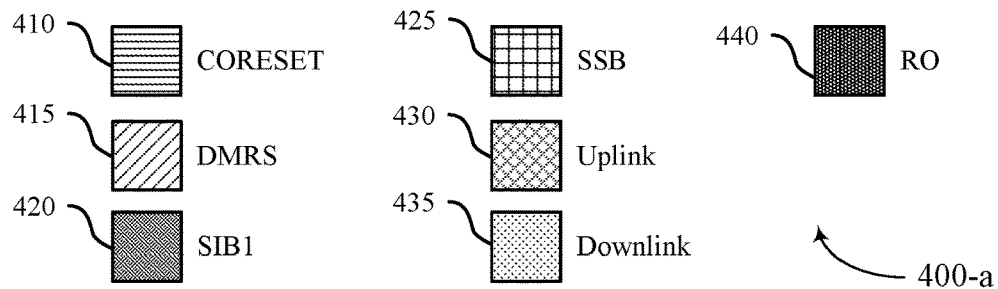
Figure 4B:
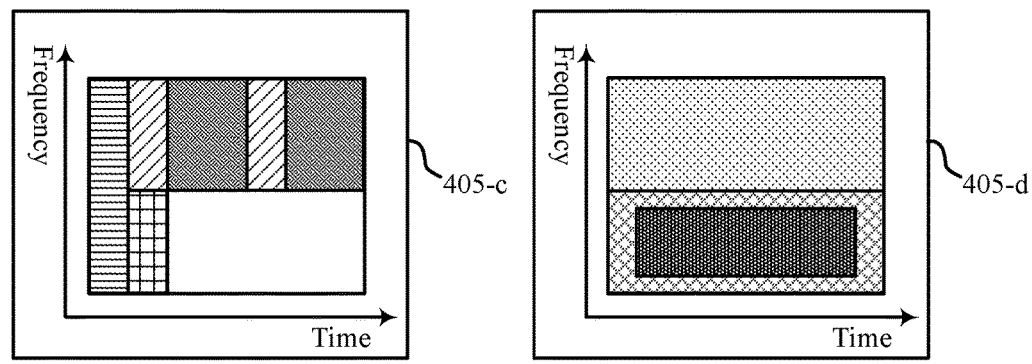
Figure 4B:
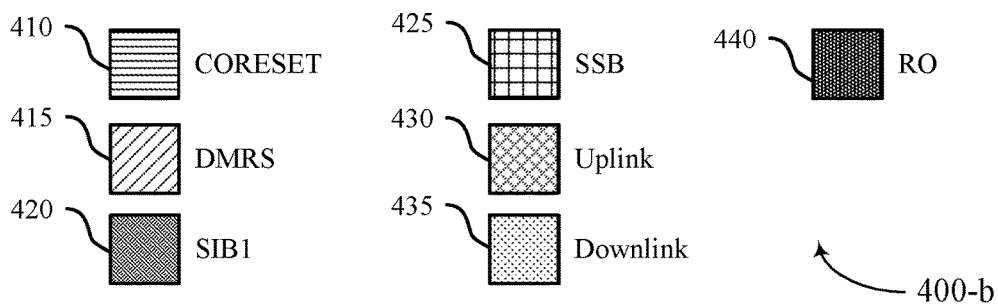

FIGS. 4A and 4B illustrate examples of full duplex operation schemes 400 that support techniques for transmitting discovery bursts using full duplex operations in accordance with various aspects of the present disclosure. In some examples, the full duplex operation schemes 400 (e.g., a full duplex operation scheme 400-*a* and a full duplex operation scheme 400-*b*) may be implemented at one or more aspects of the wireless communications system 100, the wireless communications system 200, and the timing diagrams 300. For example, the full duplex operation schemes 400 may be implemented at a UE and a network entity, which may be examples of the corresponding devices as described with reference to FIGS. 1, 2, 3A, 3B, 3C, and 3D. The full duplex operation schemes 400 may support features for improved communications between the network entity and the UE, among other possible benefits.

In some examples, a communications device (e.g., the network entity or the UE) may support full duplex communications in accordance with one or more configurations (e.g., a configuration 405-*a*, a configuration 405-*b*, a configuration 405-*c*, a configuration 405-*d*) in which the communication device may transmit and receive communication simultaneously, thereby promoting latency savings. For example, latency savings may be enabled at the UE by receiving a downlink signal in uplink slots (or symbols). In some examples, the communication device may support multiple (e.g., two) types of full duplex operations. For example, the communication device may support IBFD operations in which the communication device may transmit and receive wireless communications using a same time-frequency resource (e.g., a same slot and component carrier bandwidth). For example, downlink communications and uplink communications may share time-frequency resources (e.g., IBFD time-frequency resources). That is, the time-frequency resources used for downlink communications may partially overlap or fully overlap with time-frequency resources used for uplink communications. Additionally, or alternatively, the communication device may support SBFD operations, in which the communication device may transmit and receive communications over a same time resource and on different frequency resources. That is, the time-frequency resources used for downlink communications may be non-overlapping with time-frequency resources used for uplink communications. For example, the downlink resources may be separated from the uplink resource in the frequency domain.

As illustrated by the example of FIG. 4A, the network may configure one or more UEs in accordance with the configuration 405-a. In such an example, the network may configure uplink transmissions (e.g., transmissions of uplink 430) at the UEs in time domain resources that may be used at the network entity to transmit a discovery burst (e.g., including a CORESET 410, one or more of DMRSs 415, one or more of SIB1 420, and an SSB 425). Additionally, or alternatively, the network may configure one or more UEs in accordance with the configuration 405-b. In such an example, the network may configure uplink transmissions (e.g., and an RO 440) at the UEs in time domain resources that may be used for downlink transmissions (e.g., transmissions of downlink 435) at the network entity. In some examples, to reduce interference between the uplink transmissions (e.g., uplink 430) and the downlink transmissions (e.g., downlink 435), the network may configure the uplink 430 and the downlink 435 to be separated by a guard band. In such examples, the uplink 430 and the downlink 435 may occur over two adjacent channels. Additionally, or alternatively, as illustrated in the example of FIG. 4B, the network entity may configure the uplink 430 and the downlink 435 without a guard band. For example, the network entity may configure the UE in accordance with the configuration 405-c (e.g., a TDD slot for downlink, such as a discovery burst) and the configuration 405-d. In some examples, performing full duplex operations in accordance with one or more of the configurations 405 may support latency reductions for the network entity and the UE, among other possible benefits.

Figure 5:
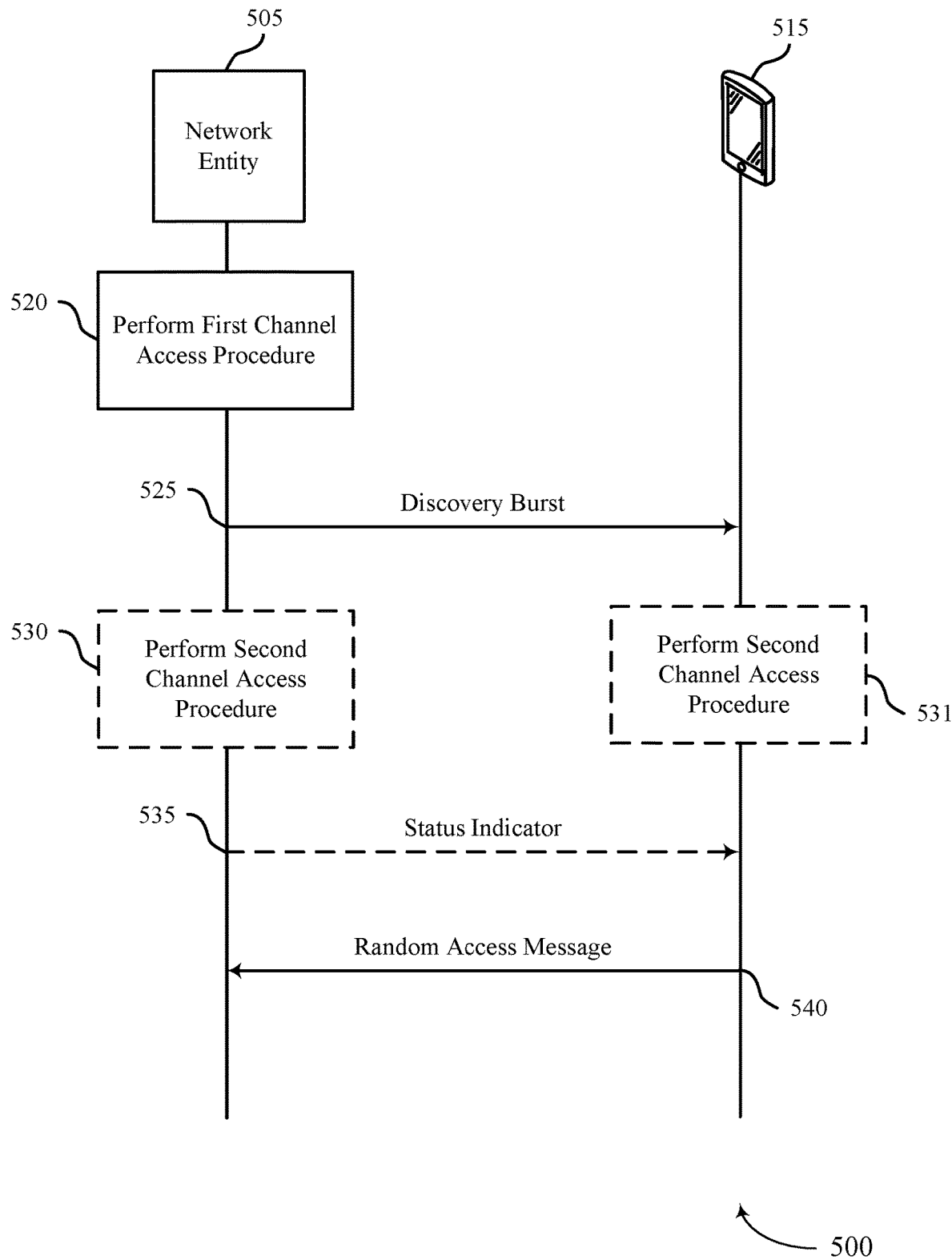
FIG. 5 illustrates an example of a process flow that supports techniques for transmitting discovery bursts using full duplex operations in accordance with various aspects of the present disclosure.

FIG. 5 illustrates an example of a process flow 500 that supports techniques for transmitting discovery bursts using full duplex operations in accordance with various aspects of the present disclosure. In some examples, the process flow 500 may implement one or more aspects of wireless communications system 100, the wireless communications system 200, the timing diagrams 300, and the full duplex operation schemes 400. For example, the process flow 500 may include example operations associated a network entity 505 and a UE 515, which may be examples of the corresponding devices described with reference to FIGS. 1, 2, 3A, 3B, 3C, 3D, 4A, and 4B. The operations performed at the network entity 505 and the UE 515 may support improvements to communications between the UE 515 and the network entity 505, among other benefits. In the following description of the process flow 500, the operations between the UE 515 and the network entity 505 may occur in a different order than the example order shown. Additionally, or alternatively, the operations performed by the UE 515 and the network entity 505 may be performed in different orders or at different times. Some operations may also be omitted.

At 520, the network entity 505 may perform a first channel access procedure to access a communication channel for outputting a discovery burst during a transmission duration. In some examples, the first channel access procedure may be an example of a channel access procedure as described throughout the present disclosure, including with reference to FIG. 2. For example, the first channel access procedure may correspond to a first type of channel access procedure that may be based on a duplex operation mode used for outputting the discovery burst.

At 525, the network entity 505 may output the discovery burst to the UE 515 during the transmission duration based on a success of the first channel access procedure. In some examples, the discovery burst may be an example of a discovery burst as described throughout the present disclosure, including with reference to FIG. 2. For example, the output discovery burst may indicate the duplex operation mode used to transmit the discovery burst. Additionally, or alternatively, the output discovery burst may indicate a second type of channel access procedure associated with a random access occasion included in the transmission duration.

At 540, the UE 515 may transmit a random access message to the network entity 505 during the random access occasion based on a success of a channel access procedure corresponding to the indicated second type of channel access procedure. In some examples, the second type of channel access procedure may correspond to a channel access procedure to be performed at the network entity 505 (e.g., on behalf of the UE 515). For example, at 530, the network entity 505 may performing a second channel access procedure during the transmission duration based on the indicated second type of channel access procedure corresponding to a type of channel access procedure to be performed at the network entity 505. In such an example, at 535, the network entity 505 may output a status indicator corresponding to an availability of the communication channel to the UE 515 based on the second channel access procedure. For example, the UE 515 may monitor for the status indicator corresponding to the availability of the communication channel based on the second type of channel access procedure corresponding to a type of channel access procedure to be performed at the network entity 505. In such examples, the UE 515 may use the random access occasion to transmit the random access message (e.g., at 540) based on the status indicator (e.g., received at the UE at 525) indicating the availability of the communication channel during the random access occasion.

In some other examples, the second type of channel access procedure may correspond to a channel access procedure to be performed at the UE 515. For example, at 531, the UE 515 may perform the second channel access procedure during a temporal gap between a first portion of the transmission duration and a second portion of the transmission duration based on the indicated second type of channel access procedure corresponding to a type of channel access procedure to be performed at the UE 515. In such examples, the UE 515 may use the random access occasion to transmit the random access message (e.g., at 540) based on a success of the second channel access procedure. In some examples, using the discovery burst to indicate the second type of channel access procedure may lead to increased efficiency for random access with the network entity, among other possible benefits.

Figure 6:
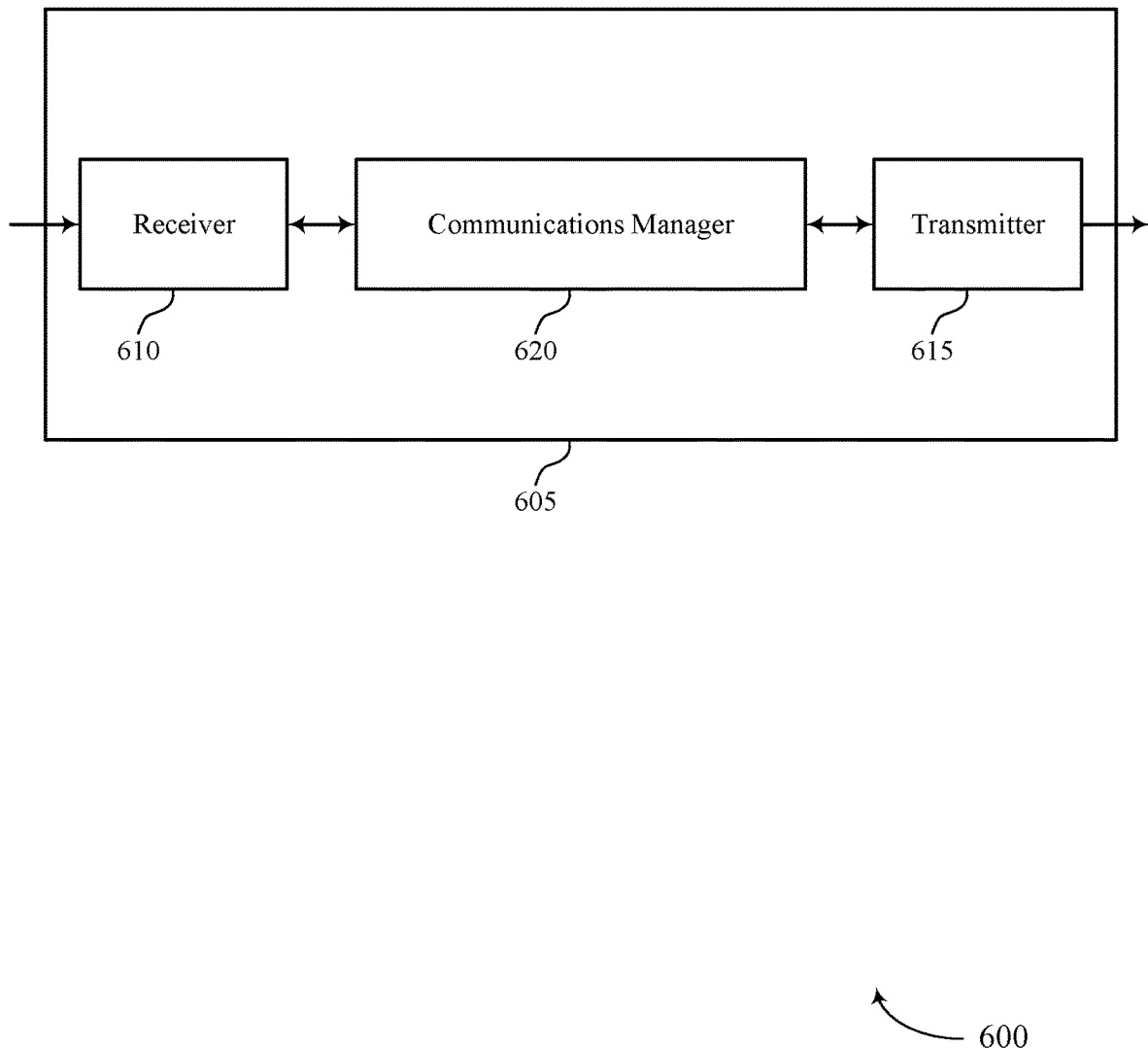
FIGS. 6 and 7 illustrate block diagrams of devices that support techniques for transmitting discovery bursts using full duplex operations in accordance with various aspects of the present disclosure.

FIG. 6 illustrates a block diagram 600 of a device 605 that supports techniques for transmitting discovery bursts using full duplex operations in accordance with various aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for transmitting discovery bursts using full duplex operations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for transmitting discovery bursts using full duplex operations). In some examples, the transmitter 615 may be co-located with a receiver 610 in a transceiver component. The transmitter 615 may utilize a single antenna or a set of multiple antennas.

The communications manager 620, the receiver 610, the transmitter 615, or various combinations thereof or various components thereof may be examples of means for performing various aspects of techniques for transmitting discovery bursts using full duplex operations as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE (e.g., the device 605) in accordance with examples as disclosed herein. For example, the communications manager 620 may be configured as or otherwise support a means for receiving a discovery burst from a network entity during a transmission duration, the received discovery burst indicating a duplex operation mode used for transmission of the discovery burst and a type of channel access procedure associated with a random access occasion included in the transmission duration. The communications manager 620 may be configured as or otherwise support a means for transmitting a random access message to the network entity during the random access occasion based on a success of a channel access procedure corresponding to the indicated type of channel access procedure.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources.

Figure 7:
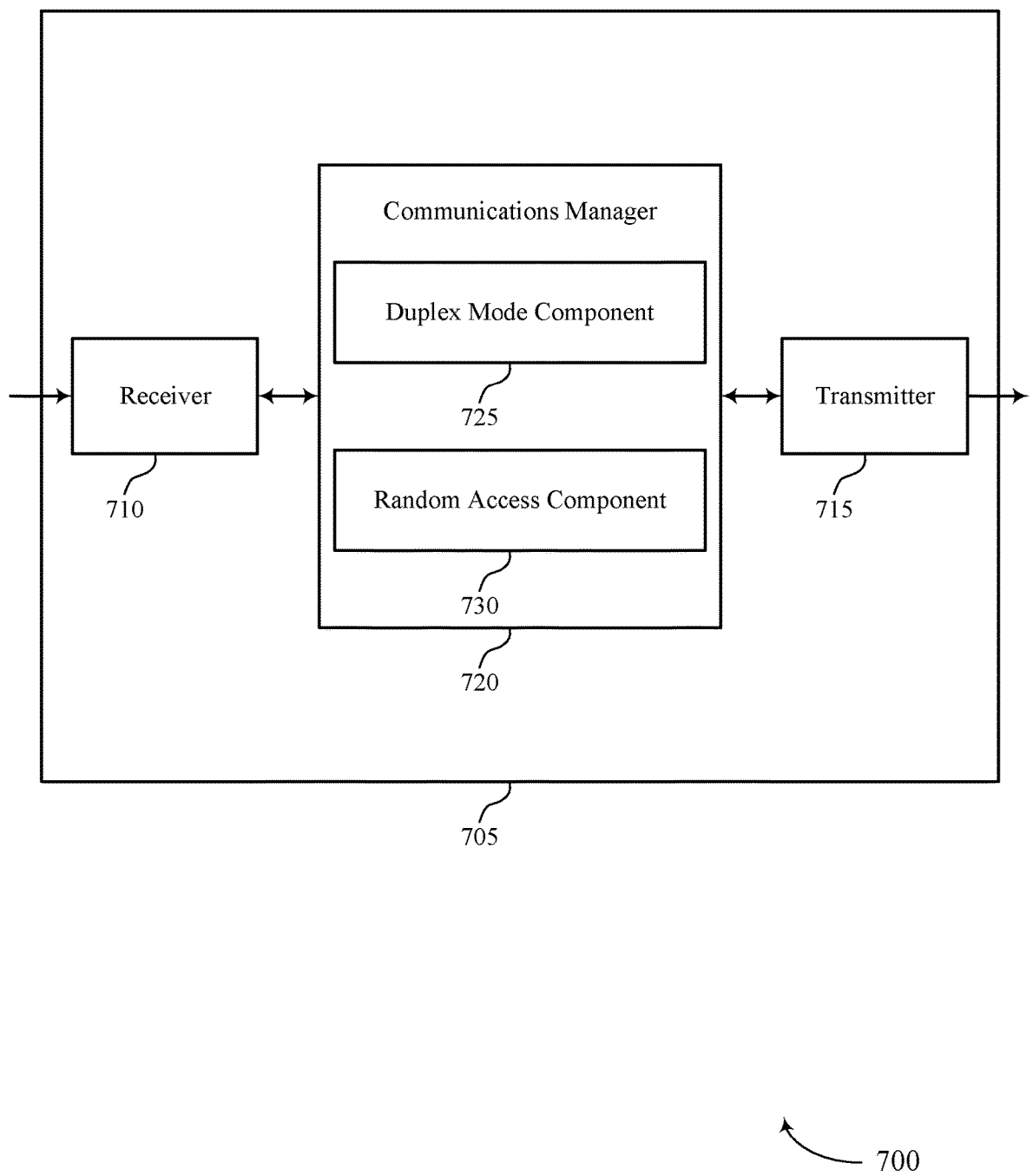

FIG. 7 illustrates a block diagram 700 of a device 705 that supports techniques for transmitting discovery bursts using full duplex operations in accordance with various aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for transmitting discovery bursts using full duplex operations). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for transmitting discovery bursts using full duplex operations). In some examples, the transmitter 715 may be co-located with a receiver 710 in a transceiver component. The transmitter 715 may utilize a single antenna or a set of multiple antennas.

The device 705, or various components thereof, may be an example of means for performing various aspects of techniques for transmitting discovery bursts using full duplex operations as described herein. For example, the communications manager 720 may include a duplex mode component 725 a random access component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE (e.g., the device 705) in accordance with examples as disclosed herein. The duplex mode component 725 may be configured as or otherwise support a means for receiving a discovery burst from a network entity during a transmission duration, the received discovery burst indicating a duplex operation mode used for transmission of the discovery burst and a type of channel access procedure associated with a random access occasion included in the transmission duration. The random access component 730 may be configured as or otherwise support a means for transmitting a random access message to the network entity during the random access occasion based on a success of a channel access procedure corresponding to the indicated type of channel access procedure.

Figure 8:
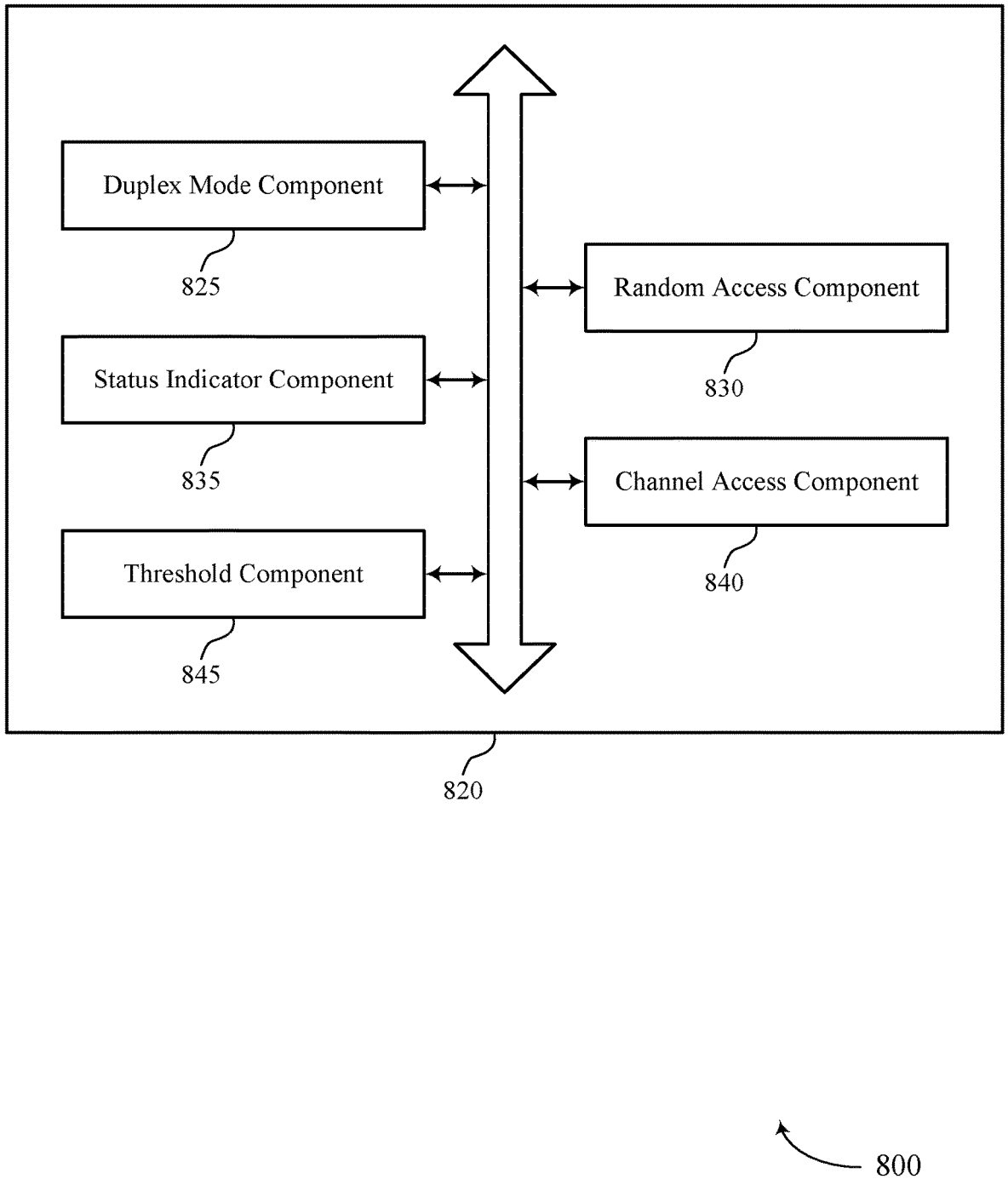
FIG. 8 illustrates a block diagram of a communications manager that supports techniques for transmitting discovery bursts using full duplex operations in accordance with various aspects of the present disclosure.

FIG. 8 illustrates a block diagram 800 of a communications manager 820 that supports techniques for transmitting discovery bursts using full duplex operations in accordance with various aspects of the present disclosure. The communications manager 820 may be an example of aspects of a communications manager 620, a communications manager 720, or both, as described herein. The communications manager 820, or various components thereof, may be an example of means for performing various aspects of techniques for transmitting discovery bursts using full duplex operations as described herein. For example, the communications manager 820 may include a duplex mode component 825, a random access component 830, a status indicator component 835, a channel access component 840, a threshold component 845, or any combination thereof. Each of these components may communicate, directly or indirectly, with one another (e.g., via one or more buses).

The communications manager 820 may support wireless communication at a UE in accordance with examples as disclosed herein. The duplex mode component 825 may be configured as or otherwise support a means for receiving a discovery burst from a network entity during a transmission duration, the received discovery burst indicating a duplex operation mode used for transmission of the discovery burst and a type of channel access procedure associated with a random access occasion included in the transmission duration. The random access component 830 may be configured as or otherwise support a means for transmitting a random access message to the network entity during the random access occasion based on a success of a channel access procedure corresponding to the indicated type of channel access procedure.

In some examples, the status indicator component 835 may be configured as or otherwise support a means for monitoring for a status indicator corresponding to an availability of a communication channel based on the indicated type of channel access procedure corresponding to a type of channel access procedure to be performed at the network entity. In some examples, the status indicator component 835 may be configured as or otherwise support a means for receiving the status indicator from the network entity based on the monitoring, where transmitting the random access message during the random access occasion is based on the received status indicator indicating the availability of the communication channel during the random access occasion.

In some examples, to support receiving the discovery burst, the duplex mode component 825 may be configured as or otherwise support a means for receiving, during a first portion of the transmission duration, an indication of the duplex operation mode used for transmission of the discovery burst and the type of channel access procedure associated with the random access occasion, the first portion of the transmission duration occurring prior to a second portion of the transmission duration that includes the random access occasion.

In some examples, to support transmitting the random access message, the random access component 830 may be configured as or otherwise support a means for transmitting the random access message to the network entity during the random access occasion based on a temporal gap between the first portion of the transmission duration and the second portion of the transmission duration satisfying a threshold.

In some examples, the channel access component 840 may be configured as or otherwise support a means for performing the channel access procedure during a temporal gap between the first portion of the transmission duration and the second portion of the transmission duration based on the indicated type of channel access procedure corresponding to a type of channel access procedure to be performed at the UE. In some examples, the channel access component 840 may be configured as or otherwise support a means for receiving, from the network entity, an indication of a set of multiple resources preempted at the network entity, where the channel access procedure is performed using the indicated set of multiple preempted resources.

In some examples, the channel access component 840 may be configured as or otherwise support a means for receiving signaling from the network entity. In some examples, the threshold component 845 may be configured as or otherwise support a means for determining a sensing threshold associated with the channel access procedure based on a received power estimated at the UE using the received signaling, where the success of the channel access procedure is based on the determined sensing threshold being satisfied.

In some examples, to support receiving the discovery burst, the duplex mode component 825 may be configured as or otherwise support a means for receiving first signaling that indicates the duplex operation mode used for transmission of the discovery burst. In some examples, to support receiving the discovery burst, the channel access component 840 may be configured as or otherwise support a means for receiving second signaling that indicates the type of channel access procedure associated with the random access occasion. In some examples, the first signaling and the second signaling are received at the UE using a broadcast channel, a control channel, or a shared data channel, or any combination thereof.

In some examples, a sensing duration associated with the channel access procedure is based on the indicated type of channel access procedure. In some examples, the discovery burst is received from the network entity using a first set of time-frequency resources that are non-overlapping, partially overlapping, or fully-overlapping in a frequency-domain with a second set of time-frequency resources used at the UE for transmitting the random access message.

Figure 9:
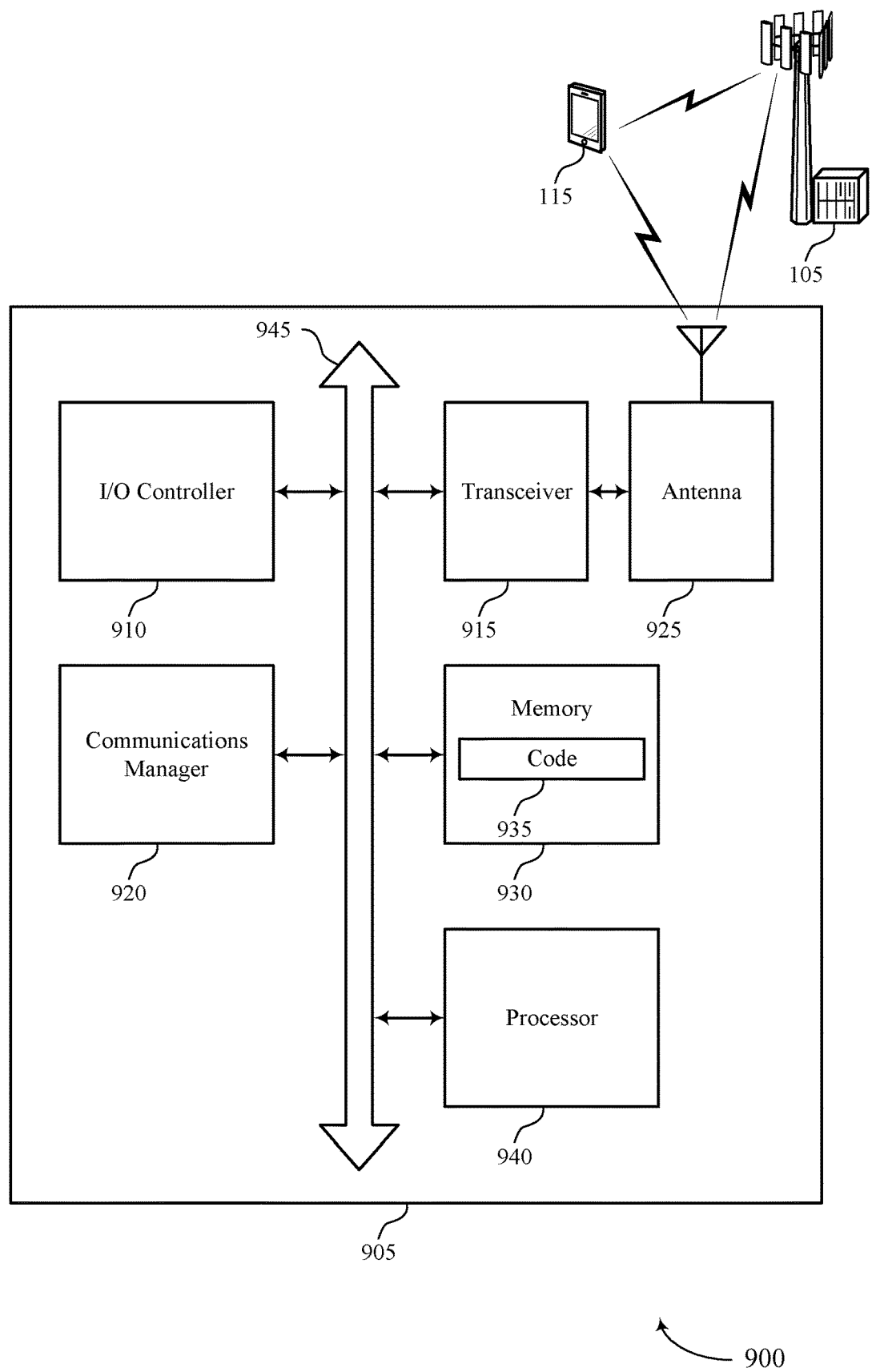
FIG. 9 illustrates a diagram of a system including a device that supports techniques for transmitting discovery bursts using full duplex operations in accordance with various aspects of the present disclosure.

FIG. 9 illustrates a diagram of a system 900 including a device 905 that supports techniques for transmitting discovery bursts using full duplex operations in accordance with various aspects of the present disclosure. The device 905 may be an example of or include the components of a device 605, a device 705, or a UE 115 as described herein. The device 905 may communicate (e.g., wirelessly) with one or more of the network entities 105, one or more of the UEs 115, or any combination thereof. The device 905 may include components for bi-directional voice and data communications including components for transmitting and receiving communications, such as a communications manager 920, an input/output (I/O) controller (e.g., an I/O controller 910), a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include an antenna 925. However, in some other cases, the device 905 may have more than one of the antenna 925, which may be capable of concurrently transmitting or receiving multiple wireless transmissions. The transceiver 915 may communicate bi-directionally, via the one or more of the antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more of the antennas 925 for transmission, and to demodulate packets received from the one or more of that antennas 925. The transceiver 915, or the transceiver 915 and one or more of the antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code (e.g., code 935) including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for transmitting discovery bursts using full duplex operations). For example, the device 905 or a component of the device 905 may include a processor 940 and memory 930 coupled with or to the processor 940, the processor 940 and memory 930 configured to perform various functions described herein.

The communications manager 920 may support wireless communication at a UE (e.g., the device 905) in accordance with examples as disclosed herein. For example, the communications manager 920 may be configured as or otherwise support a means for receiving a discovery burst from a network entity during a transmission duration, the received discovery burst indicating a duplex operation mode used for transmission of the discovery burst and a type of channel access procedure associated with a random access occasion included in the transmission duration. The communications manager 920 may be configured as or otherwise support a means for transmitting a random access message to the network entity during the random access occasion based on a success of a channel access procedure corresponding to the indicated type of channel access procedure. By including or configuring the communications manager 920 in accordance with examples as described herein, the device 905 may support techniques for reduced latency and more efficient utilization of communication resources.

In some examples, the communications manager 920 may be configured to perform various operations (e.g., receiving, monitoring, transmitting) using or otherwise in cooperation with the transceiver 915, the one or more of the antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for transmitting discovery bursts using full duplex operations as described herein, or the processor 940 and the memory 930 may be otherwise configured to perform or support such operations.

Figure 10:
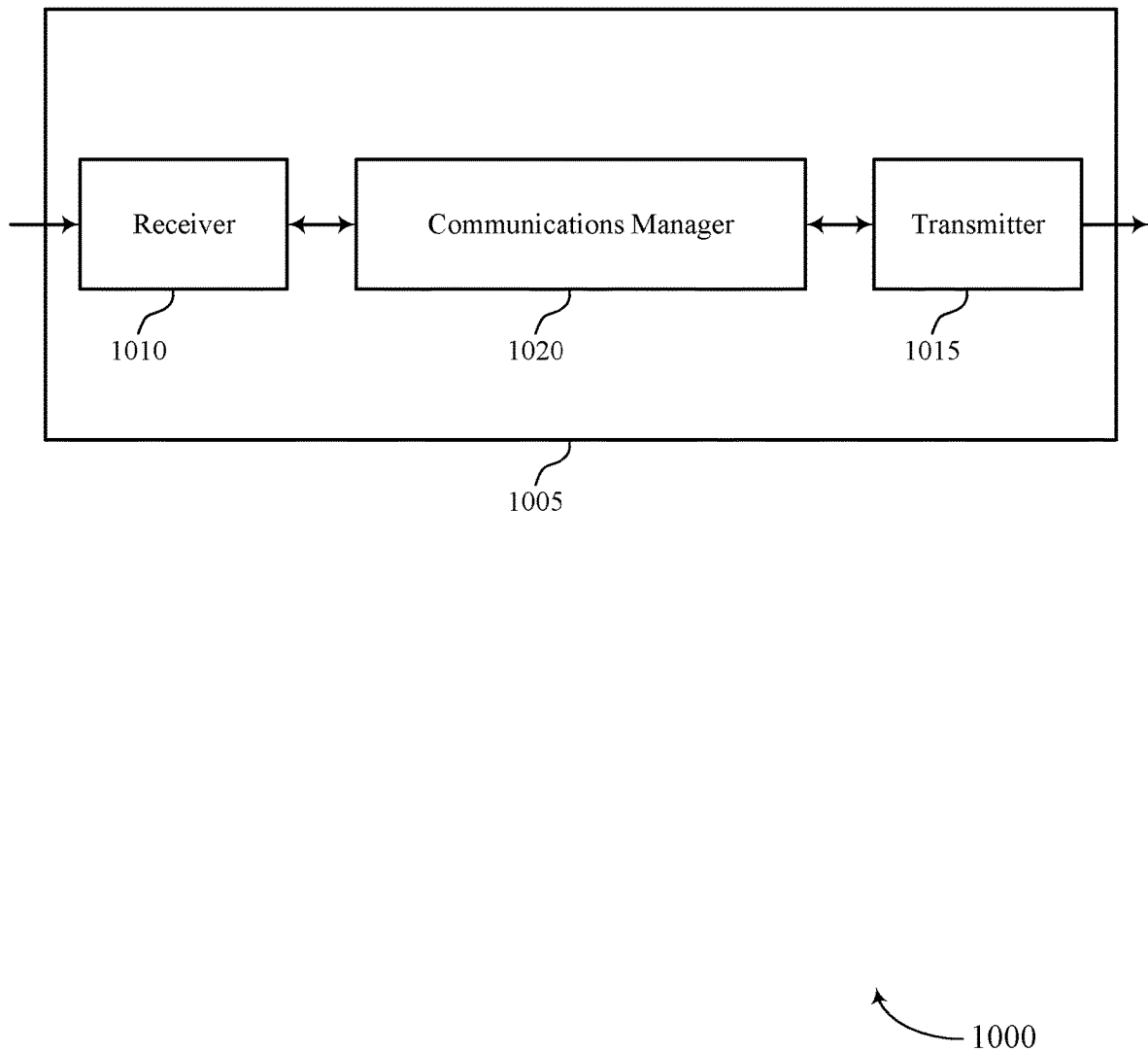
FIGS. 10 and 11 illustrate block diagrams of devices that support techniques for transmitting discovery bursts using full duplex operations in accordance with various aspects of the present disclosure.

FIG. 10 illustrates a block diagram 1000 of a device 1005 that supports techniques for transmitting discovery bursts using full duplex operations in accordance with various aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for transmitting discovery bursts using full duplex operations as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity (e.g., the device 1005) in accordance with examples as disclosed herein. For example, the communications manager 1020 may be configured as or otherwise support a means for performing a first channel access procedure to access a communication channel for outputting a discovery burst during a transmission duration, the first channel access procedure corresponding to a first type of channel access procedure that is based on a duplex operation mode used for outputting the discovery burst. The communications manager 1020 may be configured as or otherwise support a means for outputting the discovery burst to a UE during the transmission duration based on a success of the first channel access procedure, the output discovery burst indicating the duplex operation mode and a second type of channel access procedure associated with a random access occasion included in the transmission duration.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources.

Figure 11:
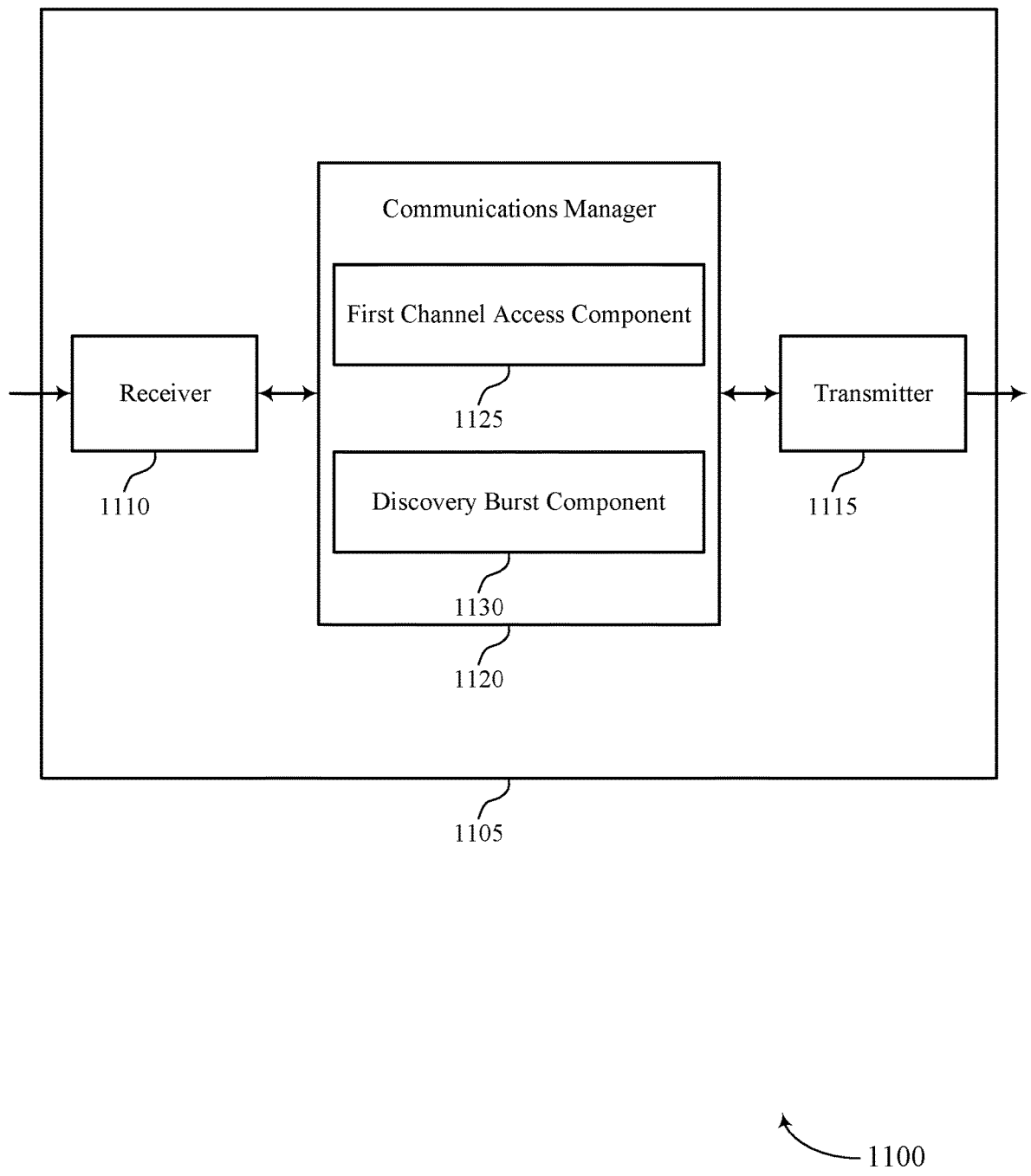

FIG. 11 illustrates a block diagram 1100 of a device 1105 that supports techniques for transmitting discovery bursts using full duplex operations in accordance with various aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for transmitting discovery bursts using full duplex operations as described herein. For example, the communications manager 1120 may include a first channel access component 1125 a discovery burst component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity (e.g., the device 1105) in accordance with examples as disclosed herein. The first channel access component 1125 may be configured as or otherwise support a means for performing a first channel access procedure to access a communication channel for outputting a discovery burst during a transmission duration, the first channel access procedure corresponding to a first type of channel access procedure that is based on a duplex operation mode used for outputting the discovery burst. The discovery burst component 1130 may be configured as or otherwise support a means for outputting the discovery burst to a UE during the transmission duration based on a success of the first channel access procedure, the output discovery burst indicating the duplex operation mode and a second type of channel access procedure associated with a random access occasion included in the transmission duration.

Figure 12:
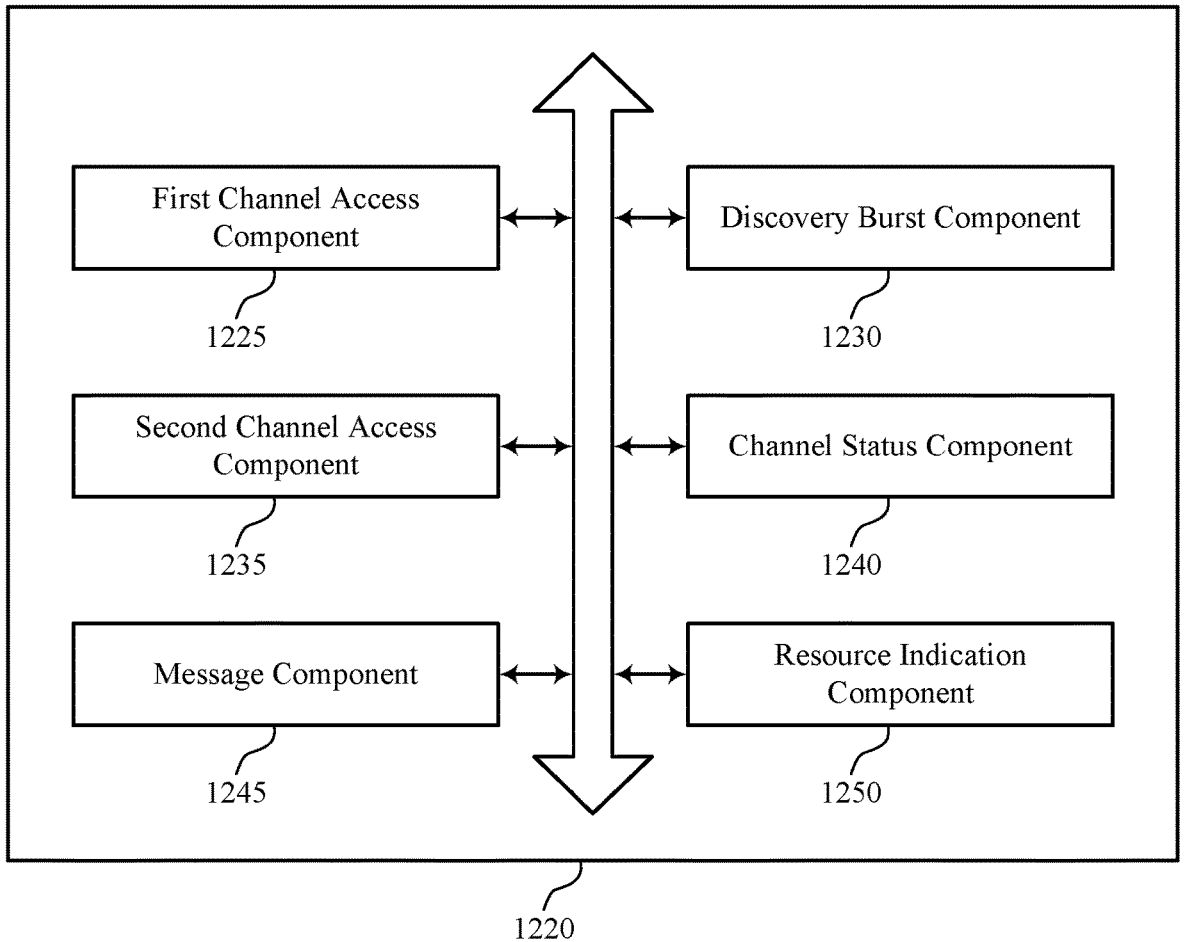
FIG. 12 illustrates a block diagram of a communications manager that supports techniques for transmitting discovery bursts using full duplex operations in accordance with various aspects of the present disclosure.

FIG. 12 illustrates a block diagram 1200 of a communications manager 1220 that supports techniques for transmitting discovery bursts using full duplex operations in accordance with various aspects of the present disclosure. The communications manager 1220 may be an example of aspects of a communications manager 1020, a communications manager 1120, or both, as described herein. The communications manager 1220, or various components thereof, may be an example of means for performing various aspects of techniques for transmitting discovery bursts using full duplex operations as described herein. For example, the communications manager 1220 may include a first channel access component 1225, a discovery burst component 1230, a second channel access component 1235, a channel status component 1240, a message component 1245, a resource indication component 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The first channel access component 1225 may be configured as or otherwise support a means for performing a first channel access procedure to access a communication channel for outputting a discovery burst during a transmission duration, the first channel access procedure corresponding to a first type of channel access procedure that is based on a duplex operation mode used for outputting the discovery burst. The discovery burst component 1230 may be configured as or otherwise support a means for outputting the discovery burst to a UE during the transmission duration based on a success of the first channel access procedure, the output discovery burst indicating the duplex operation mode and a second type of channel access procedure associated with a random access occasion included in the transmission duration.

In some examples, the second channel access component 1235 may be configured as or otherwise support a means for performing a second channel access procedure during the transmission duration based on the indicated second type of channel access procedure corresponding to a type of channel access procedure to be performed at the network entity. In some examples, the channel status component 1240 may be configured as or otherwise support a means for outputting a status indicator corresponding to an availability of the communication channel to the UE based on the second channel access procedure.

In some examples, the message component 1245 may be configured as or otherwise support a means for obtaining a random access message from the UE during the random access occasion based on the output status indicator indicating the availability of the communication channel during the random access occasion.

In some examples, to support outputting the discovery burst, the discovery burst component 1230 may be configured as or otherwise support a means for outputting, during a first portion of the transmission duration, an indication of the duplex operation mode used for outputting the discovery burst and the second type of channel access procedure associated with the random access occasion, the first portion of the transmission duration occurring prior to a second portion of the transmission duration that includes the random access occasion.

In some examples, the message component 1245 may be configured as or otherwise support a means for obtaining a random access message from the UE during the random access occasion based on the indicated second type of channel access procedure corresponding to a type of channel access procedure to be performed at the UE and a temporal gap between the first portion of the transmission duration and the second portion of the transmission duration satisfying a threshold.

In some examples, the message component 1245 may be configured as or otherwise support a means for obtaining a random access message from the UE during the random access occasion based on a success of a second channel access procedure corresponding to the indicated second type of channel access procedure.

In some examples, the resource indication component 1250 may be configured as or otherwise support a means for outputting, to the UE, an indication of a set of multiple resources preempted at the network entity based on the indicated second type of channel access procedure corresponding to a type of channel access procedure to be performed at the UE, where the second channel access procedure is to be performed at the UE using the indicated set of multiple preempted resources.

In some examples, the second channel access component 1235 may be configured as or otherwise support a means for outputting signaling to the UE based on the indicated second type of channel access procedure corresponding to a type of channel access procedure to be performed at the UE, the output signaling to be used at the UE for determination of a sensing threshold associated with the second channel access procedure. In some examples, a sensing duration associated with the second channel access procedure is based on the indicated second type of channel access procedure. In some examples, the discovery burst is output at the network entity using a first set of time-frequency resources that are non-overlapping, partially overlapping, or fully-overlapping in a frequency-domain with a second set of time-frequency resources used for obtaining the random access message from the UE.

In some examples, to support outputting the discovery burst, the discovery burst component 1230 may be configured as or otherwise support a means for outputting first signaling that indicates the duplex operation mode used for outputting the discovery burst. In some examples, to support outputting the discovery burst, the second channel access component 1235 may be configured as or otherwise support a means for outputting second signaling that indicates the second type of channel access procedure associated with the random access occasion.

In some examples, the first signaling and the second signaling are output using a broadcast channel, a control channel, or a shared data channel, or any combination thereof. In some examples, a sensing duration associated with the first channel access procedure is based on the first type of channel access procedure.

Figure 13:
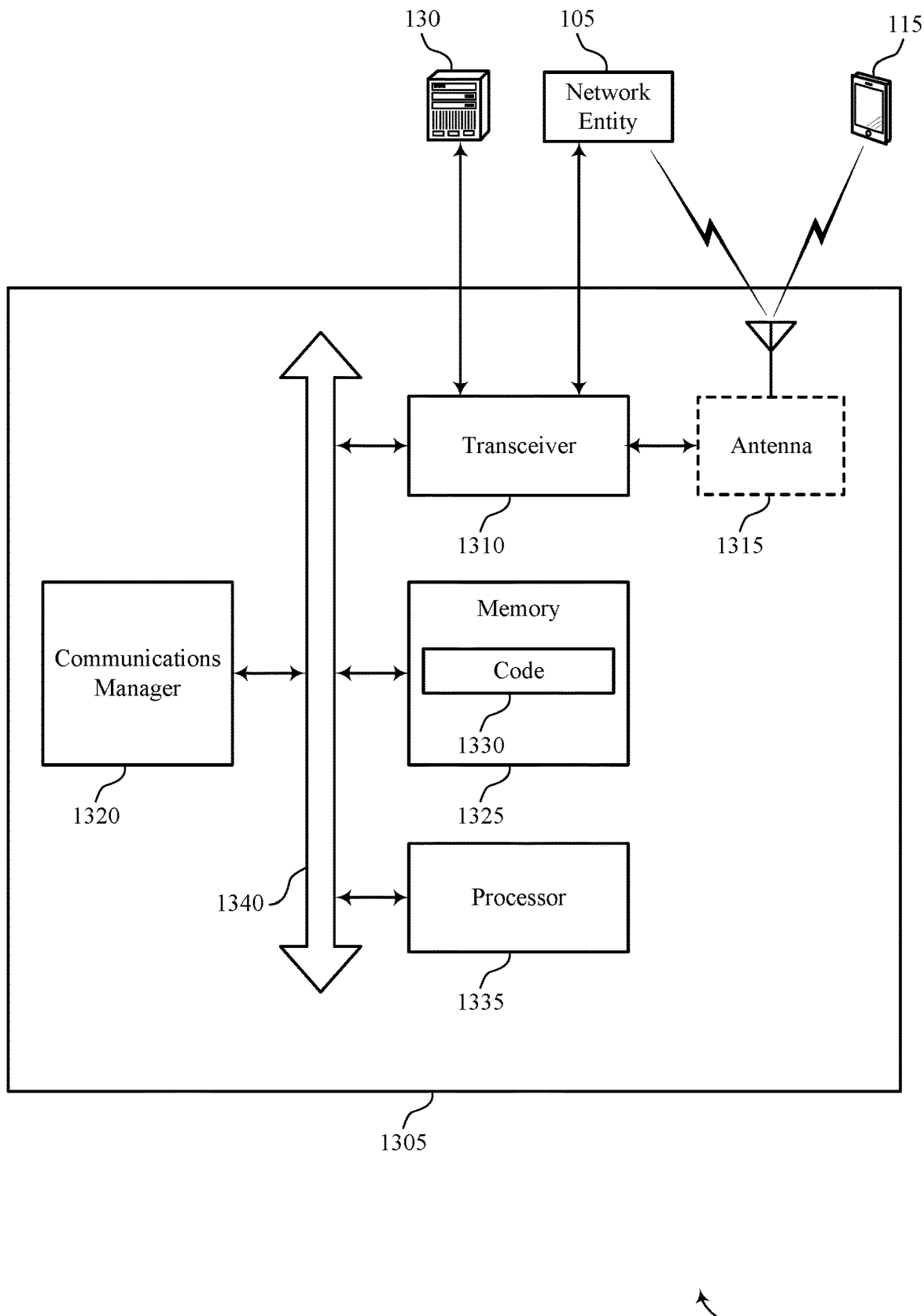
FIG. 13 illustrates a diagram of a system including a device that supports techniques for transmitting discovery bursts using full duplex operations in accordance with various aspects of the present disclosure.

FIG. 13 illustrates a diagram of a system 1300 including a device 1305 that supports techniques for transmitting discovery bursts using full duplex operations in accordance with various aspects of the present disclosure. The device 1305 may be an example of or include the components of a device 1005, a device 1105, or a network entity 105 as described herein. The device 1305 may communicate with one or more of the network entities 105, one or more of the UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more of the antennas 1315, which may be capable of transmitting or receiving wireless transmissions (e.g., concurrently). The transceiver 1310 may also include a modem to modulate signals, to provide the modulated signals for transmission (e.g., by one or more of the antennas 1315, by a wired transmitter), to receive the modulated signals (e.g., from one or more of the antennas 1315, from a wired receiver), and to demodulate signals. In some implementations, the transceiver 1310 may include one or more interfaces, such as one or more interfaces coupled with the one or more of the antennas 1315 that are configured to support various receiving or obtaining operations, or one or more interfaces coupled with the one or more of the antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more of the antennas 1315, or the transceiver 1310 and the one or more of the antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code (e.g., code 1330) including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for transmitting discovery bursts using full duplex operations). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more of the UEs 115. In some examples, the communications manager 1320 may manage communications with other network entities (e.g., network entities 105), and may include a controller or scheduler for controlling communications with UEs 115 in cooperation with other network entities (e.g., network entities 105). In some examples, the communications manager 1320 may support an X2 interface within an LTE/LTE-A wireless communications network technology to provide communication between network entities 105.

The communications manager 1320 may support wireless communication at a network entity (e.g., the device 1305) in accordance with examples as disclosed herein. For example, the communications manager 1320 may be configured as or otherwise support a means for performing a first channel access procedure to access a communication channel for outputting a discovery burst during a transmission duration, the first channel access procedure corresponding to a first type of channel access procedure that is based on a duplex operation mode used for outputting the discovery burst. The communications manager 1320 may be configured as or otherwise support a means for outputting the discovery burst to a UE during the transmission duration based on a success of the first channel access procedure, the output discovery burst indicating the duplex operation mode and a second type of channel access procedure associated with a random access occasion included in the transmission duration. By including or configuring the communications manager 1320 in accordance with examples as described herein, the device 1305 may support techniques for reduced latency and more efficient utilization of communication resources.

In some examples, the communications manager 1320 may be configured to perform various operations (e.g., receiving, obtaining, monitoring, outputting, transmitting) using or otherwise in cooperation with the transceiver 1310, the one or more of the antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of techniques for transmitting discovery bursts using full duplex operations as described herein, or the processor 1335 and the memory 1325 may be otherwise configured to perform or support such operations.

Figure 14:
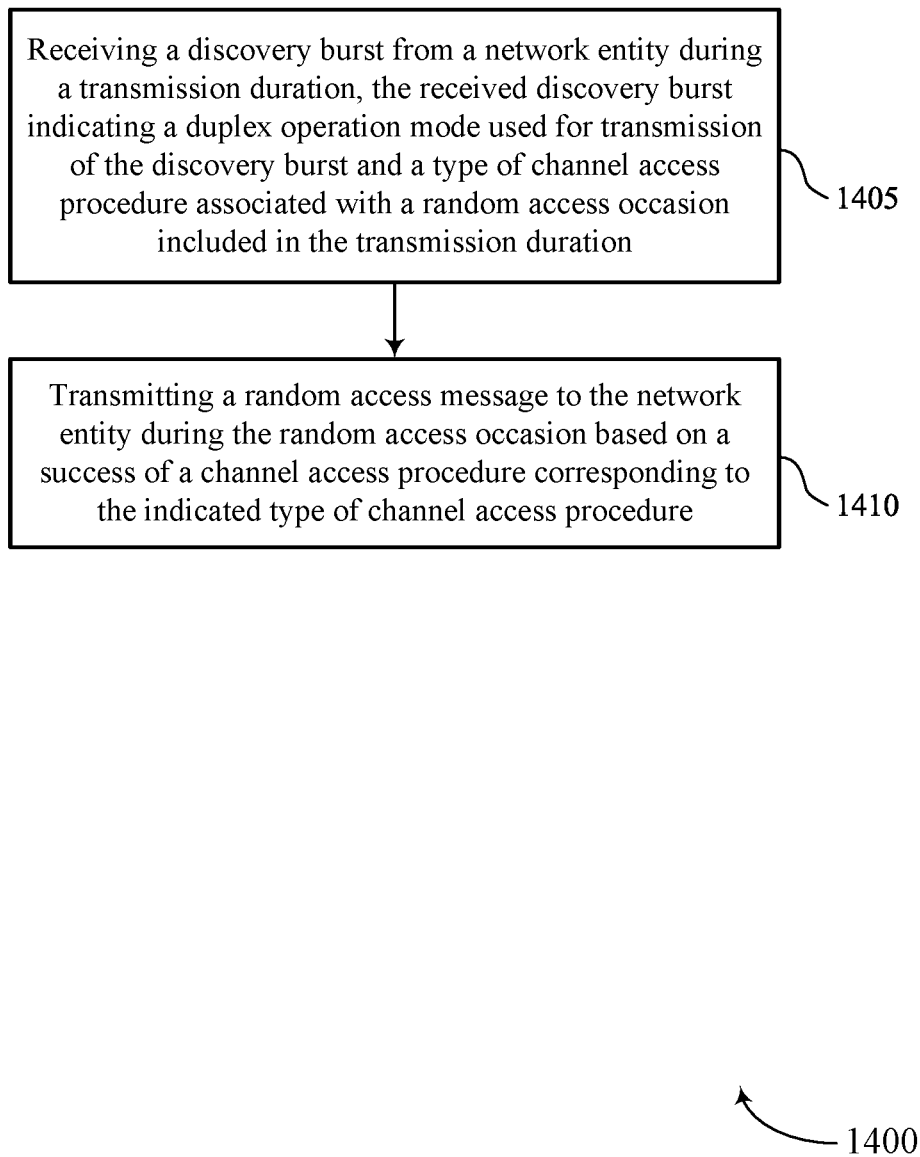
FIGS. 14 through 17 illustrate flowcharts showing methods that support techniques for transmitting discovery bursts using full duplex operations in accordance with various aspects of the present disclosure.

FIG. 14 illustrates a flowchart illustrating a method 1400 that supports techniques for transmitting discovery bursts using full duplex operations in accordance with various aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a discovery burst from a network entity during a transmission duration, the received discovery burst indicating a duplex operation mode used for transmission of the discovery burst and a type of channel access procedure associated with a random access occasion included in the transmission duration. The operations of 1405 may be performed in accordance with examples as disclosed herein. In some examples, aspects of the operations of 1405 may be performed by a duplex mode component 825 as described with reference to FIG. 8.

At 1410, the method may include transmitting a random access message to the network entity during the random access occasion based on a success of a channel access procedure corresponding to the indicated type of channel access procedure. The operations of 1410 may be performed in accordance with examples as disclosed herein. In some examples, aspects of the operations of 1410 may be performed by a random access component 830 as described with reference to FIG. 8.

Figure 15:
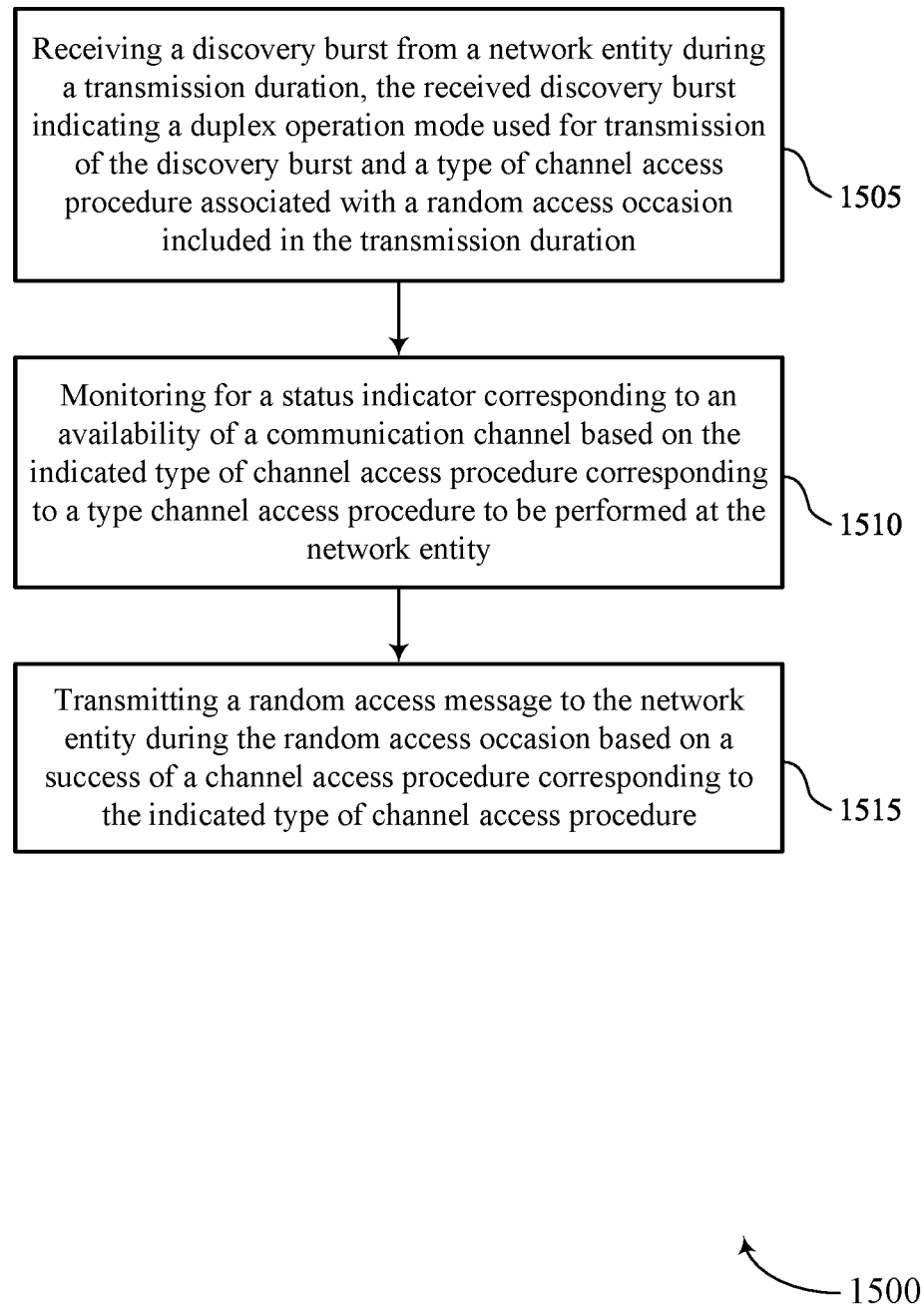

FIG. 15 illustrates a flowchart illustrating a method 1500 that supports techniques for transmitting discovery bursts using full duplex operations in accordance with various aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a discovery burst from a network entity during a transmission duration, the received discovery burst indicating a duplex operation mode used for transmission of the discovery burst and a type of channel access procedure associated with a random access occasion included in the transmission duration. The operations of 1505 may be performed in accordance with examples as disclosed herein. In some examples, aspects of the operations of 1505 may be performed by a duplex mode component 825 as described with reference to FIG. 8.

At 1510, the method may include monitoring for a status indicator corresponding to an availability of a communication channel based on the indicated type of channel access procedure corresponding to a type of channel access procedure to be performed at the network entity. The operations of 1510 may be performed in accordance with examples as disclosed herein. In some examples, aspects of the operations of 1510 may be performed by a status indicator component 835 as described with reference to FIG. 8.

At 1515, the method may include transmitting a random access message to the network entity during the random access occasion based on a success of a channel access procedure corresponding to the indicated type of channel access procedure. The operations of 1515 may be performed in accordance with examples as disclosed herein. In some examples, aspects of the operations of 1515 may be performed by a random access component 830 as described with reference to FIG. 8.

Figure 16:
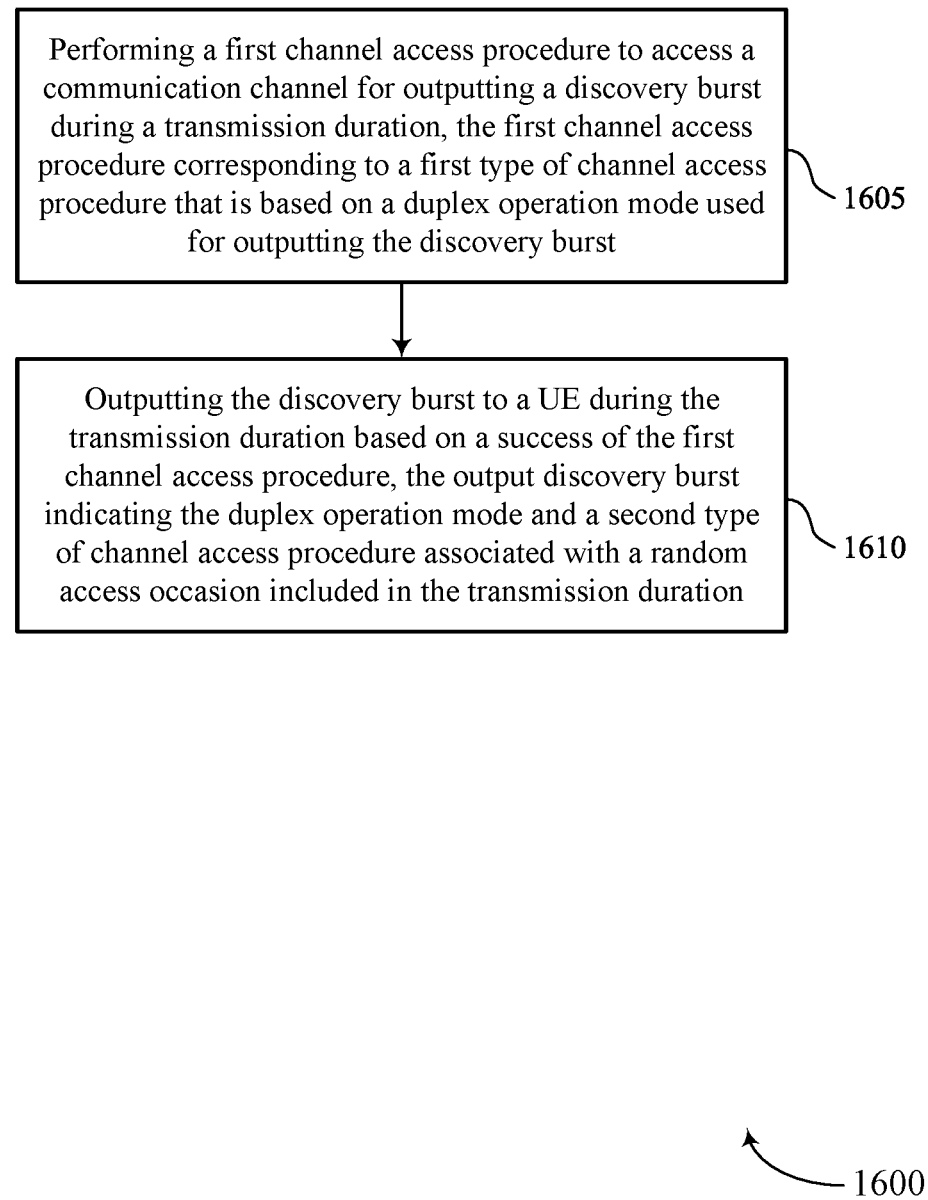

FIG. 16 illustrates a flowchart illustrating a method 1600 that supports techniques for transmitting discovery bursts using full duplex operations in accordance with various aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include performing a first channel access procedure to access a communication channel for outputting a discovery burst during a transmission duration, the first channel access procedure corresponding to a first type of channel access procedure that is based on a duplex operation mode used for outputting the discovery burst. The operations of 1605 may be performed in accordance with examples as disclosed herein. In some examples, aspects of the operations of 1605 may be performed by a first channel access component 1225 as described with reference to FIG. 12.

At 1610, the method may include outputting the discovery burst to a UE during the transmission duration based on a success of the first channel access procedure, the output discovery burst indicating the duplex operation mode and a second type of channel access procedure associated with a random access occasion included in the transmission duration. The operations of 1610 may be performed in accordance with examples as disclosed herein. In some examples, aspects of the operations of 1610 may be performed by a discovery burst component 1230 as described with reference to FIG. 12.

Figure 17:
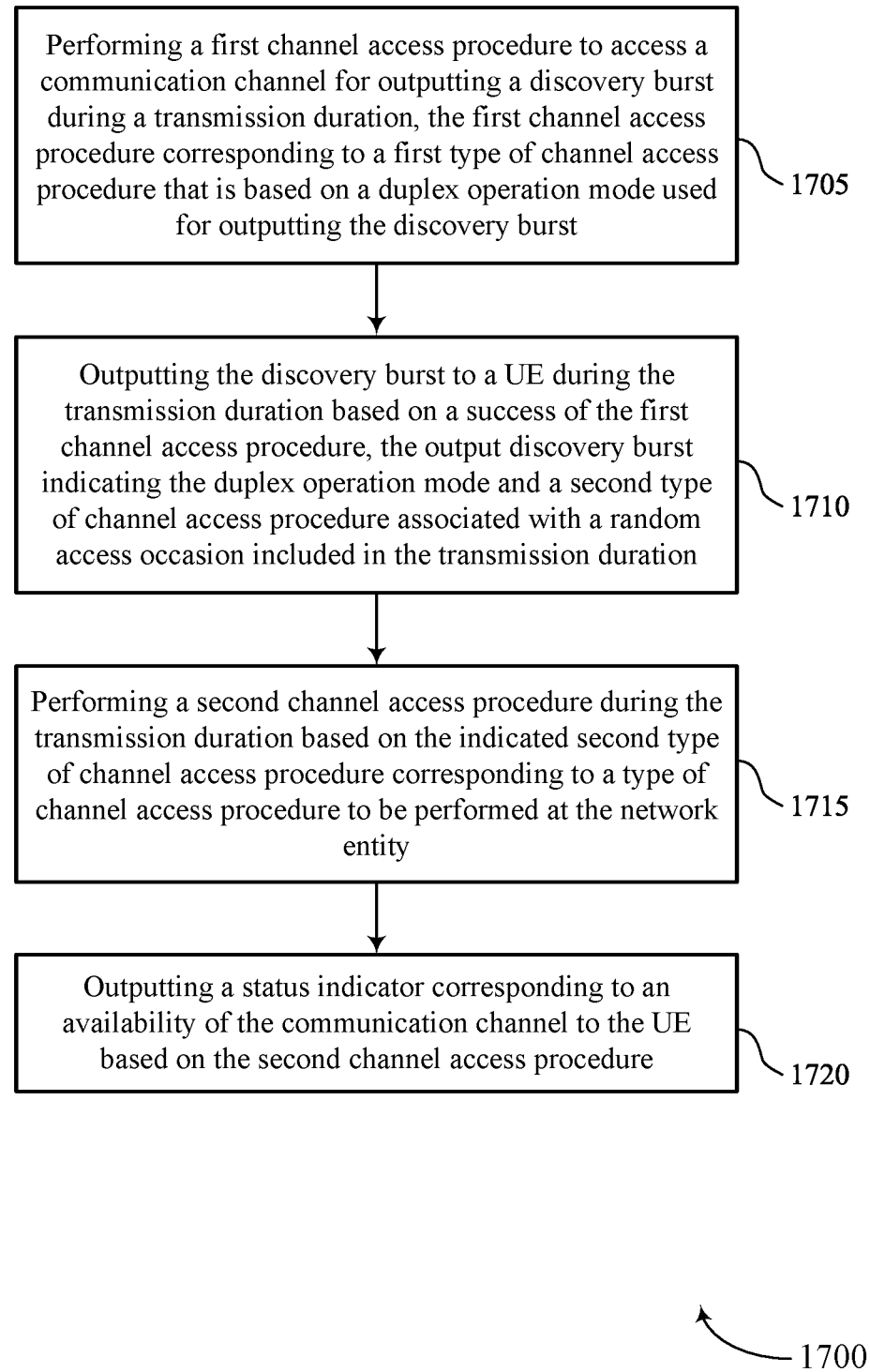

FIG. 17 illustrates a flowchart illustrating a method 1700 that supports techniques for transmitting discovery bursts using full duplex operations in accordance with various aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include performing a first channel access procedure to access a communication channel for outputting a discovery burst during a transmission duration, the first channel access procedure corresponding to a first type of channel access procedure that is based on a duplex operation mode used for outputting the discovery burst. The operations of 1705 may be performed in accordance with examples as disclosed herein. In some examples, aspects of the operations of 1705 may be performed by a first channel access component 1225 as described with reference to FIG. 12.

At 1710, the method may include outputting the discovery burst to a UE during the transmission duration based on a success of the first channel access procedure, the output discovery burst indicating the duplex operation mode and a second type of channel access procedure associated with a random access occasion included in the transmission duration. The operations of 1710 may be performed in accordance with examples as disclosed herein. In some examples, aspects of the operations of 1710 may be performed by a discovery burst component 1230 as described with reference to FIG. 12.

At 1715, the method may include performing a second channel access procedure during the transmission duration based on the indicated second type of channel access procedure corresponding to a type of channel access procedure to be performed at the network entity. The operations of 1715 may be performed in accordance with examples as disclosed herein. In some examples, aspects of the operations of 1715 may be performed by a second channel access component 1235 as described with reference to FIG. 12.

At 1720, the method may include outputting a status indicator corresponding to an availability of the communication channel to the UE based on the second channel access procedure. The operations of 1720 may be performed in accordance with examples as disclosed herein. In some examples, aspects of the operations of 1720 may be performed by a channel status component 1240 as described with reference to FIG. 12.

The following provides an overview of aspects of the present disclosure:

Aspect 1: A method for wireless communication at a UE, comprising: receiving a discovery burst from a network entity during a transmission duration, the received discovery burst indicating a duplex operation mode used for transmission of the discovery burst and a type of channel access procedure associated with a random access occasion included in the transmission duration; and transmitting a random access message to the network entity during the random access occasion based at least in part on a success of a channel access procedure corresponding to the indicated type of channel access procedure.

Aspect 2: The method of aspect 1, further comprising: monitoring for a status indicator corresponding to an availability of a communication channel based at least in part on the indicated type of channel access procedure corresponding to a type channel access procedure to be performed at the network entity.

Aspect 3: The method of aspect 2, further comprising: receiving the status indicator from the network entity based at least in part on the monitoring, wherein transmitting the random access message during the random access occasion is based at least in part on the received status indicator indicating the availability of the communication channel during the random access occasion.

Aspect 4: The method of aspect 1, wherein receiving the discovery burst comprises: receiving, during a first portion of the transmission duration, an indication of the duplex operation mode used for transmission of the discovery burst and the type of channel access procedure associated with the random access occasion, the first portion of the transmission duration occurring prior to a second portion of the transmission duration that includes the random access occasion.

Aspect 5: The method of aspect 4, wherein transmitting the random access message comprises: transmitting the random access message to the network entity during the random access occasion based at least in part on a temporal gap between the first portion of the transmission duration and the second portion of the transmission duration satisfying a threshold.

Aspect 6: The method of aspect 4, further comprising: performing the channel access procedure during a temporal gap between the first portion of the transmission duration and the second portion of the transmission duration based at least in part on the indicated type of channel access procedure corresponding to a type of channel access procedure to be performed at the UE.

Aspect 7: The method of aspect 6, further comprising: receiving, from the network entity, an indication of a plurality of resources preempted at the network entity, wherein the channel access procedure is performed using the indicated plurality of preempted resources.

Aspect 8: The method of any of aspects 6 through 7, further comprising: receiving signaling from the network entity; and determining a sensing threshold associated with the channel access procedure based at least in part on a received power estimated at the UE using the received signaling, wherein the success of the channel access procedure is based at least in part on the determined sensing threshold being satisfied.

Aspect 9: The method of any of aspects 1 through 8, wherein receiving the discovery burst comprises: receiving first signaling that indicates the duplex operation mode used for transmission of the discovery burst; and receiving second signaling that indicates the type of channel access procedure associated with the random access occasion.

Aspect 10: The method of aspect 9, wherein the first signaling and the second signaling are received at the UE using a broadcast channel, a control channel, or a shared data channel, or any combination thereof.

Aspect 11: The method of any of aspects 1 through 10, wherein a sensing duration associated with the channel access procedure is based at least in part on the indicated type of channel access procedure.

Aspect 12: The method of any of aspects 1 through 11, wherein the discovery burst is received from the network entity using a first set of time-frequency resources that are non-overlapping, partially overlapping, or fully-overlapping in a frequency-domain with a second set of time-frequency resources used at the UE for transmitting the random access message.

Aspect 13: A method for wireless communication at a network entity, comprising: performing a first channel access procedure to access a communication channel for outputting a discovery burst during a transmission duration, the first channel access procedure corresponding to a first type of channel access procedure that is based at least in part on a duplex operation mode used for outputting the discovery burst; and outputting the discovery burst to a UE during the transmission duration based at least in part on a success of the first channel access procedure, the output discovery burst indicating the duplex operation mode and a second type of channel access procedure associated with a random access occasion included in the transmission duration.

Aspect 14: The method of aspect 13, further comprising: performing a second channel access procedure during the transmission duration based at least in part on the indicated second type of channel access procedure corresponding to a type of channel access procedure to be performed at the network entity; and outputting a status indicator corresponding to an availability of the communication channel to the UE based at least in part on the second channel access procedure.

Aspect 15: The method of aspect 14, further comprising: obtaining a random access message from the UE during the random access occasion based at least in part on the output status indicator indicating the availability of the communication channel during the random access occasion.

Aspect 16: The method of any of aspects 13 through 15, wherein outputting the discovery burst comprises: outputting, during a first portion of the transmission duration, an indication of the duplex operation mode used for outputting the discovery burst and the second type of channel access procedure associated with the random access occasion, the first portion of the transmission duration occurring prior to a second portion of the transmission duration that includes the random access occasion.

Aspect 17: The method of aspect 16, further comprising: obtaining a random access message from the UE during the random access occasion based at least in part on the indicated second type of channel access procedure corresponding to a type of channel access procedure to be performed at the UE and a temporal gap between the first portion of the transmission duration and the second portion of the transmission duration satisfying a threshold.

Aspect 18: The method of any of aspects 13 through 17, further comprising: obtaining a random access message from the UE during the random access occasion based at least in part on a success of a second channel access procedure corresponding to the indicated second type of channel access procedure.

Aspect 19: The method of aspect 18, further comprising: outputting, to the UE, an indication of a plurality of resources preempted at the network entity based at least in part on the indicated second type of channel access procedure corresponding to a type of channel access procedure to be performed at the UE, wherein the second channel access procedure is to be performed at the UE using the indicated plurality of preempted resources.

Aspect 20: The method of aspect 18, further comprising: outputting signaling to the UE based at least in part on the indicated second type of channel access procedure corresponding to a type of channel access procedure to be performed at the UE, the output signaling to be used at the UE for determination of a sensing threshold associated with the second channel access procedure.

Aspect 21: The method of any of aspects 18 through 20, wherein a sensing duration associated with the second channel access procedure is based at least in part on the indicated second type of channel access procedure.

Aspect 22: The method of any of aspects 18 through 21, wherein the discovery burst is output at the network entity using a first set of time-frequency resources that are non-overlapping, partially overlapping, or fully-overlapping in a frequency-domain with a second set of time-frequency resources used for obtaining the random access message from the UE.

Aspect 23: The method of any of aspects 13 through 22, wherein outputting the discovery burst comprises: outputting first signaling that indicates the duplex operation mode used for outputting the discovery burst; and outputting second signaling that indicates the second type of channel access procedure associated with the random access occasion.

Aspect 24: The method of aspect 23, wherein the first signaling and the second signaling are output using a broadcast channel, a control channel, or a shared data channel, or any combination thereof.

Aspect 25: The method of any of aspects 13 through 24, wherein a sensing duration associated with the first channel access procedure is based at least in part on the first type of channel access procedure.

Aspect 26: An apparatus for wireless communication at a UE, comprising a processor; memory coupled with the processor; and instructions stored in the memory and executable by the processor to cause the apparatus to perform a method of any of aspects 1 through 12.

Aspect 27: An apparatus for wireless communication at a UE, comprising at least one means for performing a method of any of aspects 1 through 12.

Aspect 28: A non-transitory computer-readable medium storing code for wireless communication at a UE, the code comprising instructions executable by a processor to perform a method of any of aspects 1 through 12.

Aspect 29: An apparatus for wireless communication at a network entity, comprising a processor; memory coupled with the processor; and instructions stored in the memory and executable by the processor to cause the apparatus to perform a method of any of aspects 13 through 25.

Aspect 30: An apparatus for wireless communication at a network entity, comprising at least one means for performing a method of any of aspects 13 through 25.

Aspect 31: A non-transitory computer-readable medium storing code for wireless communication at a network entity, the code comprising instructions executable by a processor to perform a method of any of aspects 13 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving, during a first portion of a transmission duration, an indication of a duplex operation mode used for transmission of a discovery burst and a type of channel access procedure associated with a random access occasion included in a second portion of the transmission duration;
    receiving the discovery burst from a network entity during the transmission duration in accordance with the duplex operation mode used for transmission of the discovery burst and the type of channel access procedure associated with the random access occasion included in the transmission duration; and
    transmitting a random access message to the network entity during the random access occasion based at least in part on a success of a channel access procedure corresponding to the indicated type of channel access procedure.

2. The method of claim 1, further comprising:
    monitoring for a status indicator corresponding to an availability of a communication channel based at least in part on the indicated type of channel access procedure corresponding to a type of channel access procedure to be performed at the network entity.

3. The method of claim 2, further comprising:
    receiving the status indicator from the network entity based at least in part on the monitoring, wherein transmitting the random access message during the random access occasion is based at least in part on the received status indicator indicating the availability of the communication channel during the random access occasion.

4. The method of claim 1, wherein transmitting the random access message comprises:
    transmitting the random access message to the network entity during the random access occasion based at least in part on a temporal gap between the first portion of the transmission duration and the second portion of the transmission duration satisfying a threshold.

5. The method of claim 1, further comprising:
    performing the channel access procedure during a temporal gap between the first portion of the transmission duration and the second portion of the transmission duration based at least in part on the indicated type of channel access procedure corresponding to a type of channel access procedure to be performed at the UE.

6. The method of claim 5, further comprising:
    receiving, from the network entity, an indication of a plurality of resources preempted at the network entity, wherein the channel access procedure is performed using the indicated plurality of preempted resources.

7. The method of claim 5, further comprising:
    receiving signaling from the network entity; and
    determining a sensing threshold associated with the channel access procedure based at least in part on a received power estimated at the UE using the received signaling, wherein the success of the channel access procedure is based at least in part on the determined sensing threshold being satisfied.

8. The method of claim 1, wherein receiving the discovery burst comprises:
receiving first signaling that indicates the duplex operation mode used for transmission of the discovery burst; and
receiving second signaling that indicates the type of channel access procedure associated with the random access occasion.

9. The method of claim 8, wherein the first signaling and the second signaling are received at the UE using a broadcast channel, a control channel, or a shared data channel, or any combination thereof.

10. The method of claim 1, wherein a sensing duration associated with the channel access procedure is based at least in part on the indicated type of channel access procedure.

11. The method of claim 1, wherein the discovery burst is received from the network entity using a first set of time-frequency resources that are non-overlapping, partially overlapping, or fully-overlapping in a frequency-domain with a second set of time-frequency resources used at the UE for transmitting the random access message.

12. A method for wireless communication at a network entity, comprising:
performing a first channel access procedure to access a communication channel for outputting a discovery burst during a transmission duration, the first channel access procedure corresponding to a first type of channel access procedure that is based at least in part on a duplex operation mode used for outputting the discovery burst;
outputting, to a user equipment (UE) and during a first portion of the transmission duration, an indication of the duplex operation mode used for outputting the discovery burst and a second type of channel access procedure associated with a random access occasion included in a second portion of the transmission duration; and
outputting the discovery burst to the UE during the transmission duration based at least in part on a success of the first channel access procedure and in accordance with the duplex operation mode and the second type of channel access procedure associated with the random access occasion included in the second portion of the transmission duration.

13. The method of claim 12, further comprising:
performing a second channel access procedure during the transmission duration based at least in part on the indicated second type of channel access procedure corresponding to a type of channel access procedure to be performed at the network entity; and
outputting a status indicator corresponding to an availability of the communication channel to the UE based at least in part on the second channel access procedure.

14. The method of claim 13, further comprising:
obtaining a random access message from the UE during the random access occasion based at least in part on the output status indicator indicating the availability of the communication channel during the random access occasion.

15. The method of claim 12, further comprising:
obtaining a random access message from the UE during the random access occasion based at least in part on the indicated second type of channel access procedure corresponding to a type of channel access procedure to be performed at the UE and a temporal gap between the first portion of the transmission duration and the second portion of the transmission duration satisfying a threshold.

16. The method of claim 12, further comprising:
obtaining a random access message from the UE during the random access occasion based at least in part on a success of a second channel access procedure corresponding to the indicated second type of channel access procedure.

17. The method of claim 16, further comprising:
outputting, to the UE, an indication of a plurality of resources preempted at the network entity based at least in part on the indicated second type of channel access procedure corresponding to a type of channel access procedure to be performed at the UE, wherein the second channel access procedure is to be performed at the UE using the indicated plurality of preempted resources.

18. The method of claim 16, further comprising:
outputting signaling to the UE based at least in part on the indicated second type of channel access procedure corresponding to a type of channel access procedure to be performed at the UE, the output signaling to be used at the UE for determination of a sensing threshold associated with the second channel access procedure.

19. The method of claim 16, wherein a sensing duration associated with the second channel access procedure is based at least in part on the indicated second type of channel access procedure.

20. The method of claim 16, wherein the discovery burst is output at the network entity using a first set of time-frequency resources that are non-overlapping, partially overlapping, or fully-overlapping in a frequency-domain with a second set of time-frequency resources used for obtaining the random access message from the UE.

21. The method of claim 12, wherein outputting the discovery burst comprises:
outputting first signaling that indicates the duplex operation mode used for outputting the discovery burst; and
outputting second signaling that indicates the second type of channel access procedure associated with the random access occasion.

22. The method of claim 21, wherein the first signaling and the second signaling are output using a broadcast channel, a control channel, or a shared data channel, or any combination thereof.

23. The method of claim 12, wherein a sensing duration associated with the first channel access procedure is based at least in part on the first type of channel access procedure.

24. An apparatus for wireless communication at a user equipment (UE), comprising:
a processor;
memory coupled with the processor; and
instructions stored in the memory and executable by the processor to cause the apparatus to:
receive, during a first portion of a transmission duration, an indication of a duplex operation mode used for transmission of a discovery burst and a type of channel access procedure associated with a random access occasion included in a second portion of the transmission duration;
receive the discovery burst from a network entity during the transmission duration in accordance with the duplex operation mode used for transmission of the discovery burst and the type of channel access procedure associated with the random access occasion included in the transmission duration; and transmit a random access message to the network entity during the random access occasion based at least in part on a success of a channel access procedure corresponding to the indicated type of channel access procedure.

25. The apparatus of claim 24, wherein the instructions are further executable by the processor to cause the apparatus to:
monitor for a status indicator corresponding to an availability of a communication channel based at least in part on the indicated type of channel access procedure corresponding to a type of channel access procedure to be performed at the network entity.

26. The apparatus of claim 25, wherein the instructions are further executable by the processor to cause the apparatus to:
receive the status indicator from the network entity based at least in part on the monitoring, wherein transmitting the random access message during the random access occasion is based at least in part on the received status indicator indicating the availability of the communication channel during the random access occasion.

27. An apparatus for wireless communication at a network entity, comprising:
a processor,
memory coupled with the processor; and
instructions stored in the memory and executable by the processor to cause the apparatus to:
perform a first channel access procedure to access a communication channel for outputting a discovery burst during a transmission duration, the first channel access procedure corresponding to a first type of channel access procedure that is based at least in part on a duplex operation mode used for outputting the discovery burst;
output, to a user equipment (UE) and during a first portion of the transmission duration, an indication of the duplex operation mode used for outputting the discovery burst and a second type of channel access procedure associated with a random access occasion included in a second portion of the transmission duration; and
output the discovery burst to the UE during the transmission duration based at least in part on a success of the first channel access procedure and in accordance with the duplex operation mode and the second type of channel access procedure associated with the random access occasion included in the second portion of the transmission duration.

28. The apparatus of claim 27, wherein the instructions are further executable by the processor to cause the apparatus to:
perform a second channel access procedure during the transmission duration based at least in part on the indicated second type of channel access procedure corresponding to a type of channel access procedure to be performed at the network entity; and
output a status indicator corresponding to an availability of the communication channel to the UE based at least in part on the second channel access procedure.

* * * * *